ANALYSIS APPARATUS USING CONTROLLED LOGIC CIRCUITRY

Filed Feb. 20, 1962 10 Sheets-Sheet 1

INVENTORS.
M.C. Burk
C.E. Jones
H.M. Neer
BY
Young & Quigg
ATTORNEYS

Aug. 16, 1966 M. C. BURK ETAL 3,267,264

ANALYSIS APPARATUS USING CONTROLLED LOGIC CIRCUITRY

Filed Feb. 20, 1962 10 Sheets-Sheet 2

INVENTORS
MARVIN C. BURK
CHARLES E. JONES & HAROLD M. NEER
BY
Young & Quigg
ATTORNEYS INVENTORS
MARVIN C. BURK
CHARLES E. JONES & HAROLD M. NEER
BY Young & Quigg
ATTORNEYS INVENTORS
MARVIN C. BURK
CHARLES E. JONES & HAROLD M. NEER
BY
Young & Quigg
ATTORNEYS INVENTORS
MARVIN C. BURK
CHARLES E. JONES & HAROLD M. NEER
BY Young & Quigg
ATTORNEYS INVENTORS
MARVIN C. BURK
CHARLES E. JONES & HAROLD M. NEER
BY Young & Quigg
ATTORNEYS INVENTORS.
M.C. Burk
C.E. Jones
H.M. Neer BY Young & Quigg

ATTORNEYS

INVENTORS.
M.C. Burk
C.E. Jones
H.M. Neer
BY
Young & Quigg
ATTORNEYS

ANALYSIS APPARATUS USING CONTROLLED LOGIC CIRCUITRY

Filed Feb. 20, 1962 10 Sheets-Sheet 9

INVENTORS.
M.C. Burk
C.E. Jones
H.M. Neer

BY

Young & Quigg
ATTORNEYS

INVENTORS.
M.C. Burk
C.E. Jones
H.M. Neer

BY

Young & Quigg

ATTORNEYS

United States Patent Office 3,267,264
Patented August 16, 1966

3,267,264
ANALYSIS APPARATUS USING CONTROLLED LOGIC CIRCUITRY

Marvin C. Burk, Charles E. Jones, and Harold M. Neer, Bartlesville, Okla., assignors to Phillips Petroleum Company, a corporation of Delaware Filed Feb. 20, 1962, Ser. No. 174,489
8 Claims. (Cl. 235—151.35)

This invention relates to measuring and recording a plurality of signals.

Several types of analytical instruments are known which provide a plurality of output signals in sequence that are representative of the individual components of a material being analyzed. One such analyzer utilizes the principles of chromatography. A sample of a fluid mixture to be analyzed is introduced into a column which contains material that selectively retards passage therethrough of the individual components of the sample. A carrier gas is then directed through the column to elute the individual constituents in sequence. These constituents normally are detected by means of a thermal conductivity cell which measures the heat conductivity of the effluent gas from the column. The detector cell usually comprises a temperature sensitive resistance element which is connected in a bridge network so that an output voltage signal is established. Another type of analyzer which provides a plurality of output signals in sequence is a mass spectrometer. By varying either a magnetic field which deflects the charged particles or a potential which accelerates the charged particles toward the collector, the associated detector responds in sequence to charged particles having different masses. The detector circuit normally provides an output voltage representative of the rate of impingement of charged particles on the collector.

Heretofore, it has been the general practice to measure or record directly the analog voltages established by the detecting circuits of such analyzers. However, these recorded voltages cannot always be identified or interpreted readily by an operator in an industrial plant. In addition, it is often difficult for an operator to calculate the concentration of individual components of a sample mixture from the recorded voltages.

In accordance with the present invention there is provided analysis apparatus comprising an analyzer adapted to provide a plurality of output voltages in sequence, each representative of a component of the material being analyzed; converter means to provide a fluctuating output signal, the frequency of which is proportional to the amplitude of the input voltage; means to apply the output voltages from said analyzer to the input of said converter means; first and second signal counting means; means to apply all of the output signals from said converter means to said first counting means so as to register the total output of said converter means; means to apply individual output signals from said converter means to said second counting means in sequence; delay means; means for applying the output signals of said second counting means to said delay means in sequence; means for dividing; means for transferring the output of said first counting means to said means for dividing; and means for transferring said second counting means output signals from said delay means to said means for dividing in sequence to divide each of said second counting means output signals by said output of said first counting means.

Still further in accordance with the invention there is provided timing apparatus comprising a coded means; means for reading said coded means; means for moving said coded means past said means for reading; a source of pulse signals; counting means; means for applying the output of said source of pulse signals to an input of said counting means; said counting means having a plurality of output terminals with each of said output terminals corresponding to a different ratio of output pulses to input pulses; and means for controlling said means for moving to vary the speed of movement responsive to the output of one of said output terminals.

Still further in accordance with the invention there is provided apparatus for converting a plurality of input signals, each comprising a series of pulses, into percentage signals, each of which is representative of a respective one of said input signals as a percentage of the total of said input signals, comprising, first and second counting means; means for applying all of said input signals to said first counting means so as to register the total of said input signals; means for applying individual ones of said input signals to said second counting means in sequence; storage means; means for transferring each of the individual output signals of said second counting means in sequence to said storage means; subtracting means; means for transferring the output of said first counting means to the minuend input of said means for subtracting; means for transferring each of said individual output signals from said storage means in sequence to the subtrahend input of said subtracting means; and means for producing a plurality of output signals, each being representative of the number of times the respective individual output signal from said storage means can be subtracted from said output of said first counting means.

Still further in accordance with the invention there is provided apparatus for recording a plurality of signals in sequence, each of said signals comprising a series of pulses; comprising, a counter; means for applying said plurality of signals in sequence to an input of said counter; an "and" circuit; means for applying the output of said counter to a first input of said "and" circuit; means for transmitting a gating pulse to a second input of said "and" circuit corresponding to the termination of each of said signals; means for converting the output of said "and" circuit into a form suitable for controlling an automatic recording means; and means for applying the output of said means for converting to an input of said recording means.

Accordingly it is an object of this invention to provide method and apparatus for measuring and recording a plurality of signals. Another object of the invention is to provide apparatus for measuring and recording a plurality of signals which are received in sequence. A still further object of the invention is to provide a method and apparatus for converting a plurality of electrical serial pulse form signals, the number of which is representative of a signal magnitude, into a form suitable for utilization with an automatic typewriter. A still further object of the invention is to provide an improved method and apparatus for recording the output of analytical instruments. Another object of the invention is to provide an improved method and apparatus for programming an operation. Yet another object of the invention is to provide an improved normalizing computer system. A still further object of the invention is to provide improved method and apparatus for measuring a plurality of signals and producing an output representative of each signal as a percentage of the total of said signals. Yet another object of the invention is to provide an improved timing apparatus.

Other aspects, objects, and advantages of the invention will become apparent from a study of the disclosure, the drawing, and the appended claims.

In the drawings FIGURE 1 is a schematic representation of an analyzing system embodying the present invention;

FIGURE 2 (comprising the two fragments designated FIGURES 2*a* and 2*b*) is a schematic representation of a programmer which can be utilized in the system of FIGURE 1;

FIGURE 3 (comprising the two fragments designated FIGURES 3*a* and 3*b*) is a schematic representation of a normalizing computer which can be utilized in the system of FIGURE 1;

Figure 1:
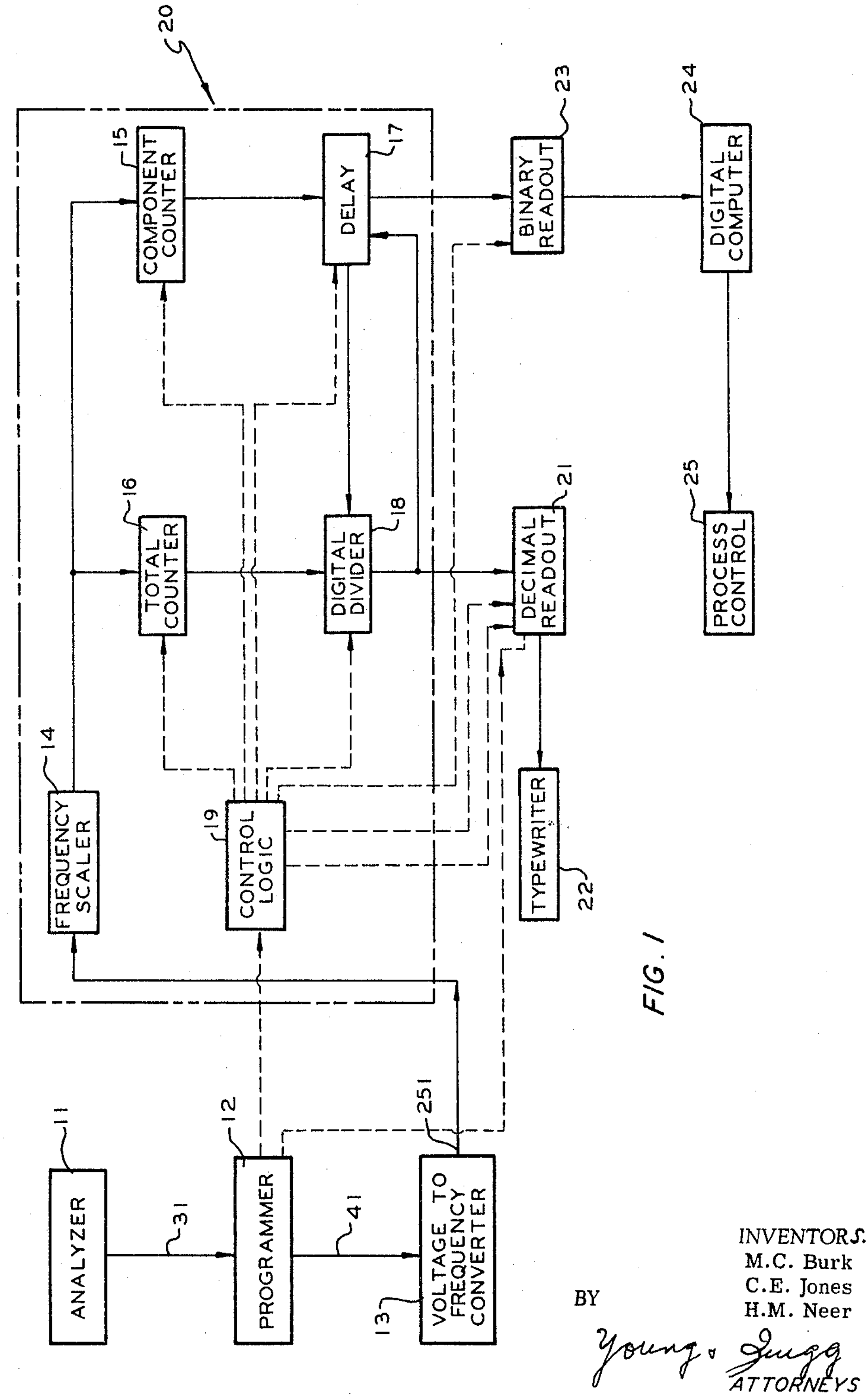

Referring now to the drawing in detail and to FIGURE 1 in particular there is shown an analyzer 11, which can be any suitable analyzer such as a chromatographic analyzer or a mass spectrometer. The analog voltage output signal form the analyzer is transmitted to programmer 12 wherein it can be amplified, compensated for detector response, and scaled by the desired full scale range factor. A voltage-to-frequency converter 13 converts the output signal from programmer 12 to a series of pulses with a frequency proportional to the amplitude of the programmer output signal. A suitable converter for this purpose is the DY–2210 converter, manufactured by Dymec Inc., Palo Alto, California, and which is described in Control Engineering, March 1959, page 144. The number of pulses generated from the time the programmer output signal leaves the base line until it returns to the base line represents the time integral of the component peak.

The output of converter 13 is applied to the input of a frequency scaler 14. Frequency scaler 14 comprises a plurality of frequency dividing circuits such that the frequencies of the output signals from the frequency dividing circuits are preselected fractions of the frequency F of the input signal. Thus, the frequencies of the output signals of the frequency dividing circuits can be, for example F, F/2, F/4, F/8, etc. The output of frequency scaler 14 can be connected to the output of the frequency dividing circuit having the desired ratio. The output of frequency scaler 14 is connected to the inputs of component counter 15 and total counter 16. Total counter 16 counts all the pulses in the output signal of frequency scaler 14 as a measurement of the integral of all componets combined. Component counter 15 counts the pulses in the output of frequency scaler 14 for a first interval corresponding to a first component as a measurement of the integral of said first component. The count corresponding to the first component is then transferred to delay 17 wherein it is stored. If more than one range factor is utilized, the range factor corresponding to the respective component is also transmitted to delay 17 along with the component count. Component counter 15 is then reset for a second interval of operation corresponding to the second component. At the end of the second interval the count is transferred from component counter 15 to delay 17 wherein it is stored and component counter 15 is again reset for another interval of operation. This procedure is repeated until the integral of each of the components has been stored in delay 17. The output of total counter 16 is then transmitted to digital divider 18. The individual component integral signals are transmitted in sequence from delay 17 to digital divider 18 wherein they are normalized by dividing each component signal by the output signal from total counter 16. The location of the decimal point for each component is determined by the respective range factor. The operation of component counter 15, total counter 16, delay 17 and digital divider 18 can be controlled by control logic system 19, which is turn can be controlled by programmer 12. Counters 15, and 16, delay 17, digital divider 18, and control logic 19 constitute normalizing computer 20.

The output of digital divider 18 is in serial pulse form with each pulse representing a certain percentage increment. The output of digital divider 18 is transmitted to the input of decimal readout system 21 wherein it is converted into a 10-line serial pulse output required by the control solenoids of typewriter 22. The 10-line serial pulse output of decimal readout 21 is transmitted along with appropriate control signals to typewriter 22. The operation of decimal readout system 21 can be controlled by signals from control logic 19 and programmer 12.

The normalized data can be returned to delay 17 for storage until needed. At a command from control logic 19, binary readout 23 can transfer the data to digital computer 24 in binary code. The output of computer 24 can be utilized in process control 25 to manipulate selected variables of a process.

Figure 2A:
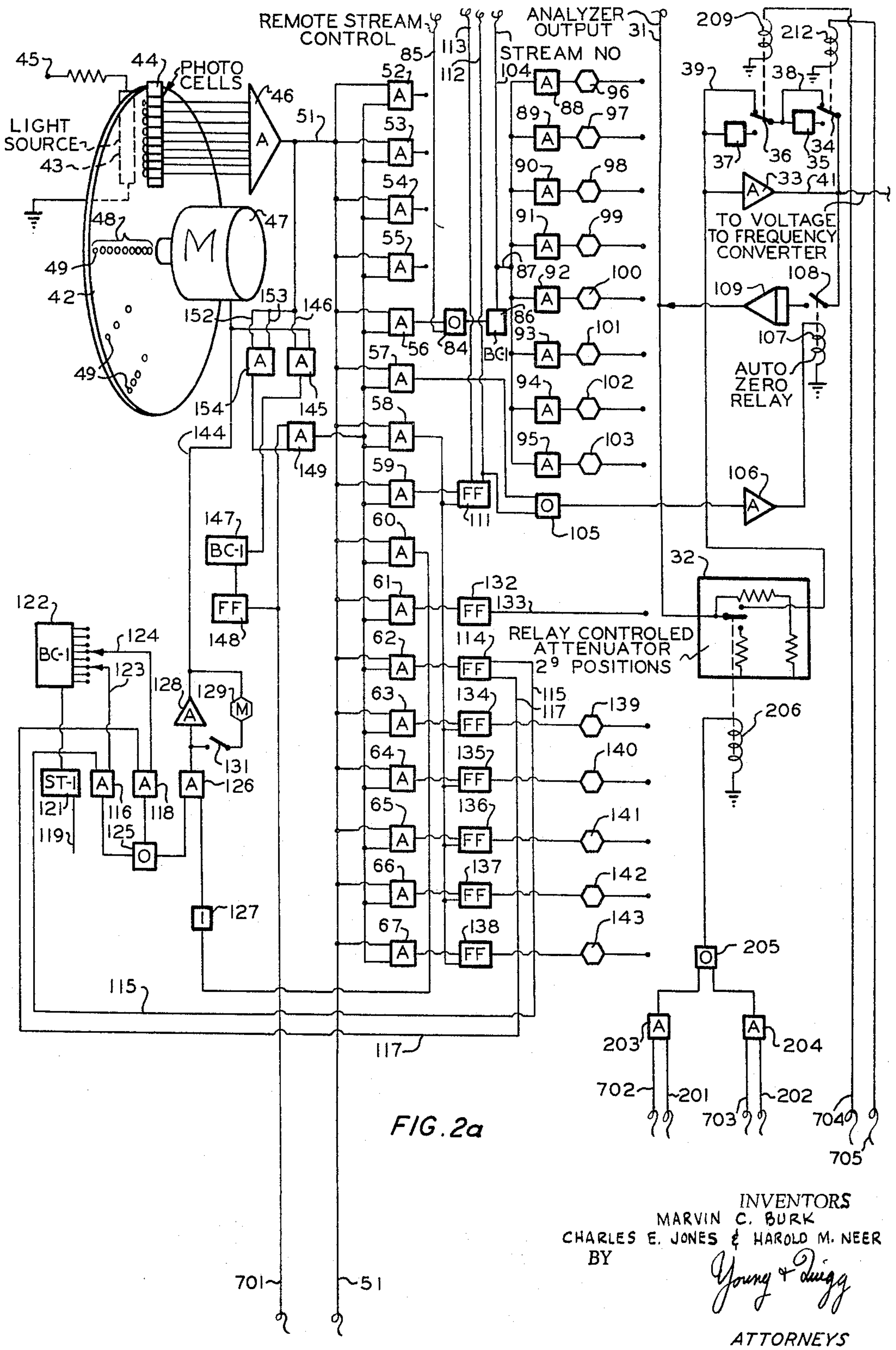
Figure 2B:
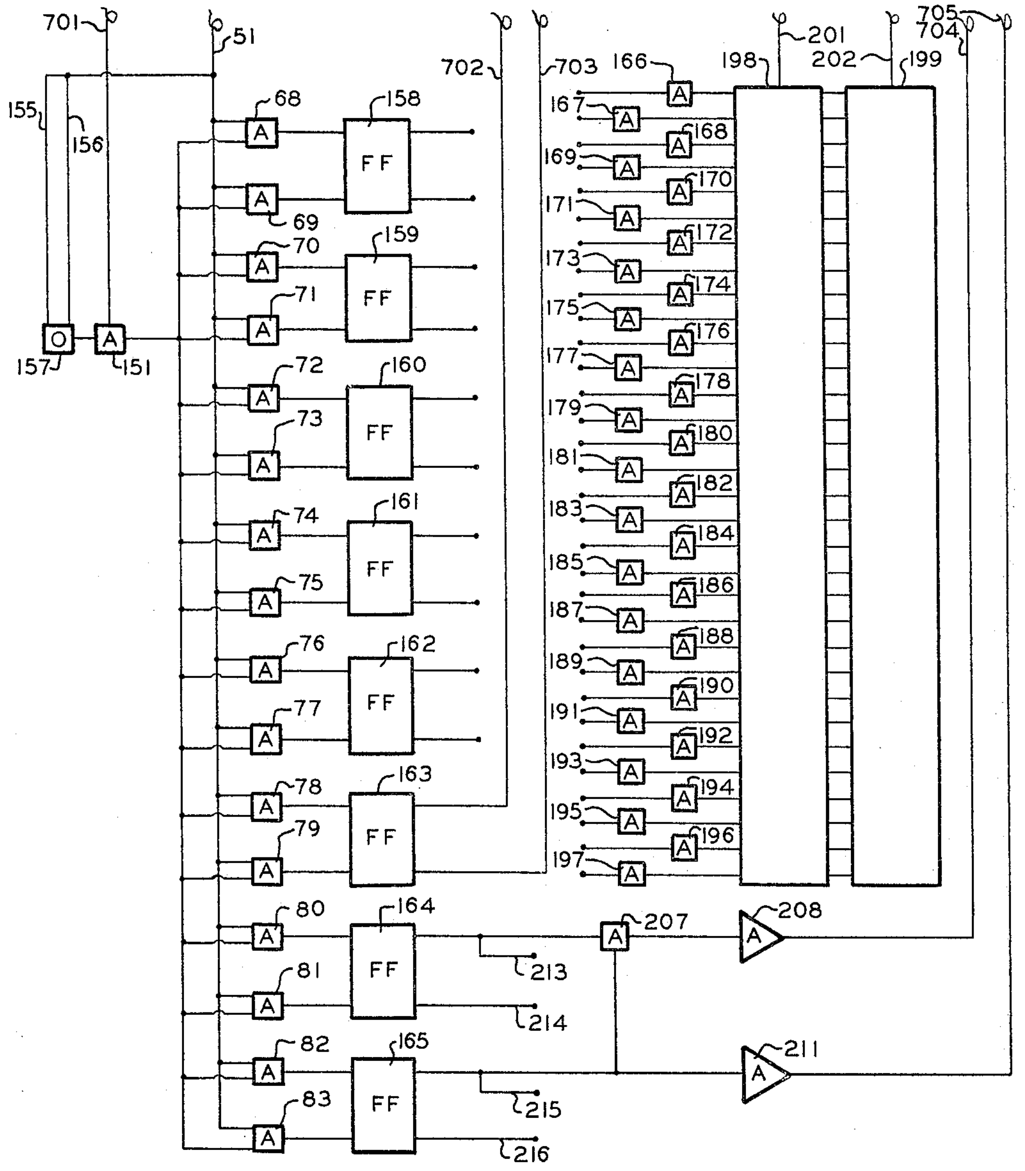

Referring now to FIGURE 2 the output of analyzer 11 is transmitted through line 31 and relay controlled attenuator 32 to an input of data amplifier 33. The output of amplifier 33 is applied to a feedback circuit comprising switch 34, resistance 35, switch 36 and resistance 37. Resistances 35 and 37 are provided with bypass lines 38 and 39, respectively. For convenience in the binary operations of normalizing computer 20, range changes can be associated with factors of 8. Thus for a 100 percent range, switches 34 and 36 can be set to bypass lines 38 and 39, respectively, for a feedback of 1; for a 10 percent range, one of resistances 35 and 37 can be connected in the feedback circuit to produce a feedback of ⅛; and for a 1 percent range, both resistances 35 and 37 can be connected in the feedback circuit to produce a feedback of $\frac{1}{64}$. The output of amplifier 33 is transmitted through line 41 to an input of voltage-to-frequency converter 13.

The operation of programmer 12 is controlled by coded disk 42, light source 43 and photocells 44. Light source 43 can be connected between ground and a suitable source of potential 45. The outputs of photocells 44 are connected to respective inputs of amplifier 46. Disk 42 is preferably a punched paper disk driven by a timing motor 47.

A row of holes can be punched in disk 42 along any radial line, such as row 48. Each row of holes contains a timing hole 49 smaller than the other holes to insure that all of the code holes for a given row are in position before a reading is made. Any suitable number, such as eight, of code hole positions in each row can be utilized. Eight positions corresponding to 1, 2, 4, 8, 16, 32, 64 and 128 can be utilized to establish $2^8$ or 256 different code combinations. The angular position of a row relative to the starting or reference position determines the time each operation occurs while the combination of holes in the row determines which operation occurs. Of the 256 possible combinations a suitable number, such as the first 64 (0–63) are set aside for such functions as sampling, zeroing, column switching, etc. This leaves combinations 65 to 256 for selecting one of three percentages binations 65 to 256 for selecting one of three percentage ranges and for attenuation factors having a suitable range, such as 16 to 1. The individual outputs of amplifier 46, which for the purpose of simplicity correspond to 1, $\bar{1}$, 2, $\bar{2}$, 4, $\bar{4}$, 8, $\bar{8}$, 16, $\overline{16}$, 32, $\overline{32}$, 64, $\overline{64}$, 128 and $\overline{128}$, are transmitted through cable 51 to respective inputs of "and" circuits 52 through 83. The bar over a number signifies that that number was not present in the coded signal.

Thus in a multiple stream sampling operation for analyzing samples from eight different sources in sequence a single code hole (in addition to the timing hole 49) can be punched in the 4 position. When this code row passes between light source 43 and photocells 44, the photocell corresponding to the 4 position is actuated and a signal is transmitted through amplifier 46 to "and" circuit 56. The output of "and" circuit 56 is applied to one input of "or" circuit 84. A remote stream control signal can be applied through line 85 to a second input of "or" circuit 84. Upon the application of a signal to either input of "or" circuit 84, a signal is passed to counter 86, which can be any suitable counter such as binary counter module BC–1 manufactured by Packard Bell Computer Corporation. The outputs of counter 86, which represent the number of the stream to be analyzed, are transmitted through cable 87 to respective inputs of "and" circuits 88 through 95. The outputs of "and" circuits 88 through 95 are connected to solenoid drivers 96 through 103, respectively. The solenoid drivers can be any suitable device such as solid state electronic switches and relays. The "and" circuit corresponding to the stream to be analyzed passes a signal to the respective solenoid driver which in turn actuates a valve in the respective sample line to pass a sample to analyzer 11. Each time the 4 code appears on disk 42, the output of counter 86 will be advanced by one and the next sample stream valve will be actuated. The output of counter 86 can also be transmitted through line 104 to the decimal readout system 21 to be utilized as a control signal as described hereinafter.

The output of "and" circuit 57 is connected to one input of "or" circuit 105. The output of "or" circuit 105 is amplified by amplifier 106 and passed through coil 107 to close normally open switch 108 to connect integrator 109 between the output of amplifier 33 and the input of attenuator 32 for "zeroing" the output of amplifier 33. "And" circuit 57 can be actuated at any suitable time, such as after each component. The output of "and" circuit 59 is applied to one input of flip flop circuit 111, one output of which represents a "compute" signal hereinafter designated as "N" and which is transmitted to normalizing computer 20 along line 112 as a control signal and is also applied as an input to "or" circuit 105 to permit "zeroing" of amplifier 33 during the time after an analysis of a stream has been completed and normalizing computer 20 is determining the component percentages. The other output of flip flop circuit 111 is present during the time normalizing computer 20 is not computing and is designated hereinafter as "$\overline{N}$." The "$\overline{N}$" signal is transmitted along line 113 to normalizing computer 20 as a control signal. The output of "and" circuit 58 is applied to flip flop circuit 111 as a reset signal.

If it is desired to drive disk 42 at a first speed for selected code signals to provide sufficient time for mechanical response and to drive disk 42 at a second speed for other code signals, the output of "and" circuit 62, corresponding to the code 10, can be applied to flip flop circuit 114. A first state output of flip flop circuit 114 corresponding to a first speed is transmitted through line 115 to "and" circuit 116. The second state output of flip flop circuit 114 corresponding to the second speed is transmitted through line 117 to "and" circuit 118. A time pulse signal, such as a 60 c.p.s. signal, is applied through line 119 the pulse shaper 121 to an input of counter 122, which can be any suitable counter such as a cascade of binary counter modules manufactured by Packard Bell Computer Corporation. Counter 122 has a plurality of output terminals corresponding to predetermined fractions of the input, such as 1, ½, ¼, ⅛, 1/16, 1/32 etc. Line 123 is connected betwen an output terminal of counter 122 corresponding to the first desired speed and an input to "and" circuit 116. Line 124 is connected between an output terminal of counter 122 corresponding to the second desired speed and an input to "and" circuit 118. While only one flip flop circuit and two "and" circuits corresponding to a choice of two speeds have been illustrated, any suitable number can be utilized to provide the desired combination of speeds for disk 42. While the switches connecting lines 123 and 124 to selected outputs of counter 122 can be any suitable type of switch, the multiple position switch disclosed and claimed in copending application Serial No. 165,491, filed January 11, 1962, now Patent No. 3,151,226, by C. E. Jones and E. H. Sholl is preferred.

The outputs of "and" circuits 116 and 118 are applied as inputs to "or" circuit 125. The output of "or" circuit 125 is applied as an input to "and" circuit 126. The ouput of "and" circuit 60, corresponding to code 8, is applied through inverter 127 to an input of "and" circuit 126. Thus, whenever the code 8 is not presented on disk 42 a false signal will be passed by "and" circuit 60 to an inverter 127 where it will be inverted to a true signal which will then be applied to "and" circuit 126, thus passing the output of "or" circuit 125 to the input of amplifier 128. The code 8 can be utilized to automatically stop the operation of the programmer, if such is desired. A restart signal can be applied either manually or automatically to the input of amplifier 128 to cause disk 42 to rotate and remove the code 8 output. Amplifier 128 is provided with a feedback circuit comprising a resistance 129 and switch 131 to provide a suitable feedback such as ⅔. The output of amplifier 128 is transmitted to the input of timing motor 47, which can be any suitable timing motor such as the Sigma Cyclonoma Stepping Motor manufactured by Sigma Instruments Incorporated of South Braintree, Massachusetts. The number of pulses in the output of amplifier 128 can be 1, ½, ¼, ⅛, 1/16, 1/32, 1/64, etc., times the input of counter 122, when switch 131 is open and ⅓, ⅙, 1/12, 1/24, 1/48, etc., times the input to counter 122 when switch 131 is closed. Thus motor 47 can be driven at any of a plurality of different speeds by simply manipulating switch 131 and the switches connecting lines 123 and 124 to the outputs of counter 122.

The output of "and" circuit 61, corresponding to code 9, is applied as an input to flip flop circuit 132. One output of flip flop circuit 132 which represents a "signal off" and signifies that theanalyzer 11 is not producing an output, is transmitted through line 133 to normalizing computer 20 as a control signal. The outputs of "and" circuits 63–67 are applied as inputs to flip flop circuits 134–138, respectively. First outputs of flip flop circuits 134–138 are applied to solenoid drivers 139–143, respectively. Solenoid drivers 139–143 can be any suitable switch device such as solid state electronic switches or relays, and can be utilized to control the input of a sample to analyzer 11, to control the application of a flushing gas, and other analyzer control functions. The output of "and" circuit 58 is applied as an input to flip flop circuits 134–138 to reset the flip flop circuits. The outputs of "and" circuits 52–55 can be utilized for any desired control function.

The output of amplifier 128 is transmitted through line 144 to an input of "and" circuit 145. A signal, corresponding to the occurrence of a timing hole 49, is transmitted through line 146 to a second input of "and" circuit 145. The output of "and" circuit 145 is transmitted to an input of binary counter 147. The output of binary counter 147 represents a preselected fraction, such as ¼, of the input to binary counter 147 and is transmitted to flip flop circuit 148. The output of flip flop circuit 148 is applied as an input to "and" circuits 149 and 151. The output of "and" circuit 149 is applied as an input to each of "and" circuits 52–67. The output of "and" circuit 151 is applied as an input to each of "and" circuits 68–83. Signals corresponding to $\overline{64}$ and $\overline{128}$ are transmitted from the output of amplifier 46 through lines 152 and 153, respectively, to first and second inputs of "and" circuit 154. The output of "and" circuit 154 is applied as an input to "and" circuit 149. Signals corresponding to 64 and 128 are transmitted from amplifier 46 through lines 155 and 156 to "or" circuit 157. The output of "or" circuit 157 is applied as an input to "and" circuit 151. Thus when the output of amplifier 46 represents a code number of 63 or less the output of "and" circuit 154 is applied to the input of "and" circut 149 to pass the timing pulses from flip flop circuit 148 to the second inputs of "and" circuits 52–67, and the output of "or" circuit 157 is zero thus causing blocking of the timing pulses from flip flop circuit 148 by "and" circuit 151. When the output of amplifier 46 corresponds to a code number of 64 or higher the output of "or" circuit 157 is applied to "and" circuit 151 to pass the timing pulses from flip flop circuit 148 to the second input of "and" circuits 68–83 while the output of "and" circuit 154 is zero and blocks "and" circuit 149. "And" circuit 145, binary counter 147, and flip flop circuit 148 are utilized to provide a single timing pulse corresponding to each coded row in disk 42 to prevent actuation of "and" circuits 52–83 more than once for each coded row.

The outputs of "and" circuits 68 and 69 are applied as first and second inputs to flip flop circuit 158; the outputs of "and" circuits 70 and 71 are applied as first and second inputs to flip flop circuit 159; the outputs of "and" circuits 72 and 73 are applied as first and second inputs to flip flop circuit 160; the outputs of "and" circuits 74 and 75 are applied as first and second inputs to flip flop circuit 161; the outputs of "and" circuits 76 and 77 are applied as first and second inputs to flip flop circuit 162; the outputs of "and" circuits 78 and 79 are applied as first and second inputs to flip flop circuit 163; the outputs of "and" circuits 80 and 81 are applied as first and second inputs to flip flop circuit 164; and the outputs of "and" circuits 82 and 83 are applied as first and second inputs to flip flop circuit 165. The outputs of flip flop circuits 158, 159, 160, 161, and 162 are applied to selected inputs of "and" circuits 166–197 which are in turn connected to respective inputs of the 32 inputs to pin boards 198 and 199 which are in parallel. Pin boards 198 and 199 each have a suitable number of outputs, such as 9, which are transmitted through cables 201 and 202 to first inputs of "and" circuits 203 and 204, respectively. The desired attenuation factors are achieved by connecting each one of the inputs to pin boards 198 and 199 to at least one of the outputs of the respective pin board. The first output of flip flop circuit 163 is a second input to "and" circuit 203 while the second output of flip flop circuit 163 is applied as a second input to "and" circuit 204. The outputs of "and" circuits 203 and 204 are applied to the inputs of "or" circuit 205. Thus, the output of flip flop circuit 163 determines whether the attenuation factor corresponding to pin board 198 or the attenuation factor corresponding to pin board 199 is transmitted to "or" circuit 205. The output of "or" circuit 205 is passed through a relay system 206 to actuate the switches in relay controlled attenuator 32. While only two "and" circuits 203 and 204 and "or" circuit 205 and relay 206 have been illustrated for the purposes of simplicity, it is obvious that there would be one "and" circuit for each output of pin boards 198 and 199 with a second input to each of the "and" circuits corresponding to the outputs of pin boards 198 being connected to first output of flip flop circuit 163, and the second input to each of the "and" circuits corresponding to the outputs of pin board 199 being connected to the second output of flip flop circuit 163. Relay system 206 could contain the same number of relays as pin board 198 has outputs. Thus relay controlled attenuator 32 can be manipulated, for the example shown in FIGURE 2 to $2^9$ positions.

The first output of flip flop circuit 164 is connected to an input of "and" circuit 207. The first output of flip flop circuit 165 is connected to the second input of "and" circuit 207. The output of "and" circuit 207 is connected through amplifier 208 to relay 209 to actuate switch 36. The first output of flip flop circuit 165 is also connected through amplifier 211 to relay 212 to actuate switch 34. The first and second outputs of flip flop circuit 164 and the first and second outputs of flip flop circuit 165 are transmitted through lines 213, 214, 215, and 216, respectively, to normalizing computer 20 as range control signals.

The advantages of the programmer of FIGURE 2 include large storage capacity, ease of programming, conservation of space, and the application of all of the stored programmed information on the paper disk. The complete program, including attenuation factors, can be changed by simply changing the paper disk. The programmer is suitable for use with analog readout systems as well as utilization in the system of FIGURE 1.

Figure 3A:
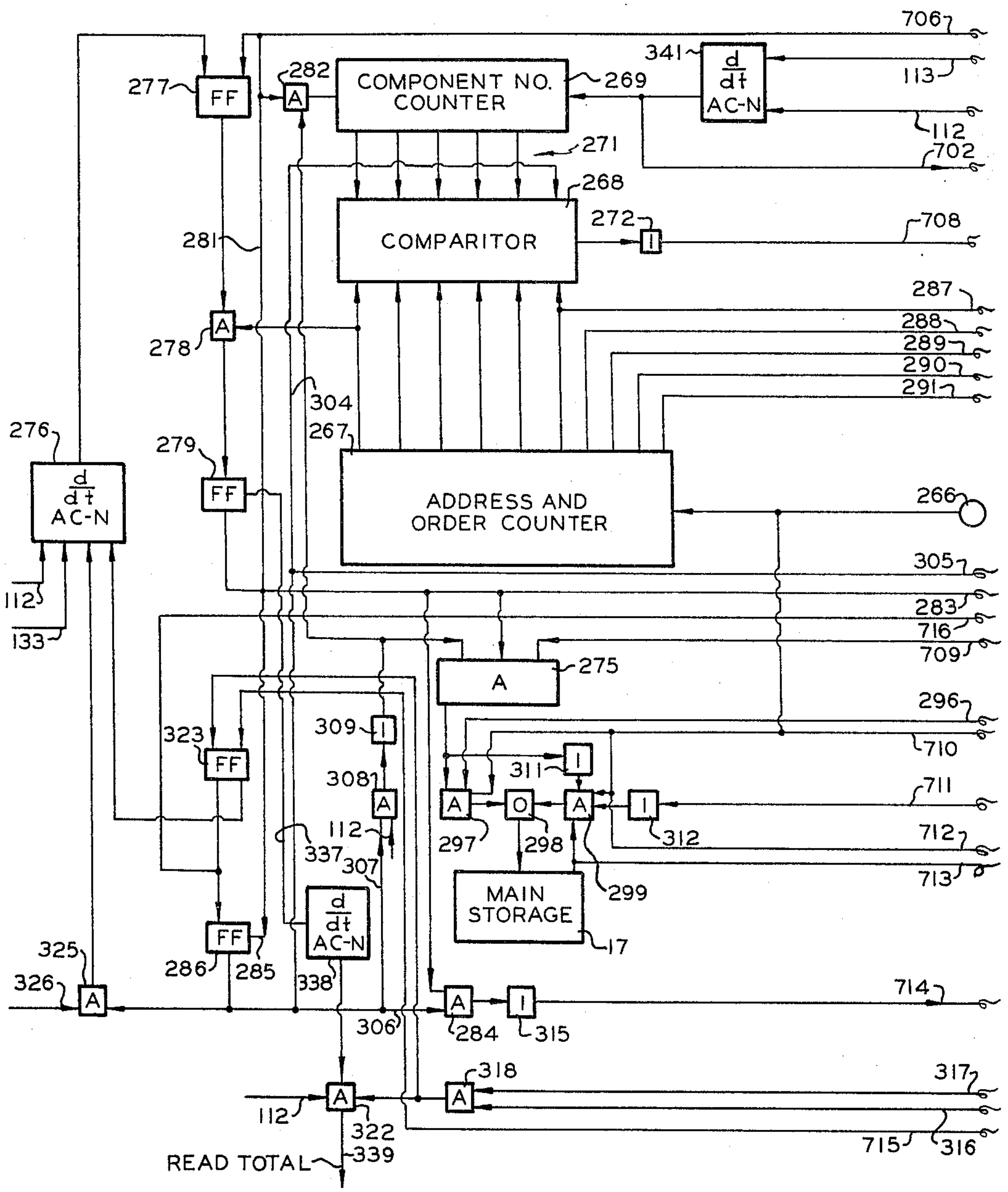
Figure 3B:
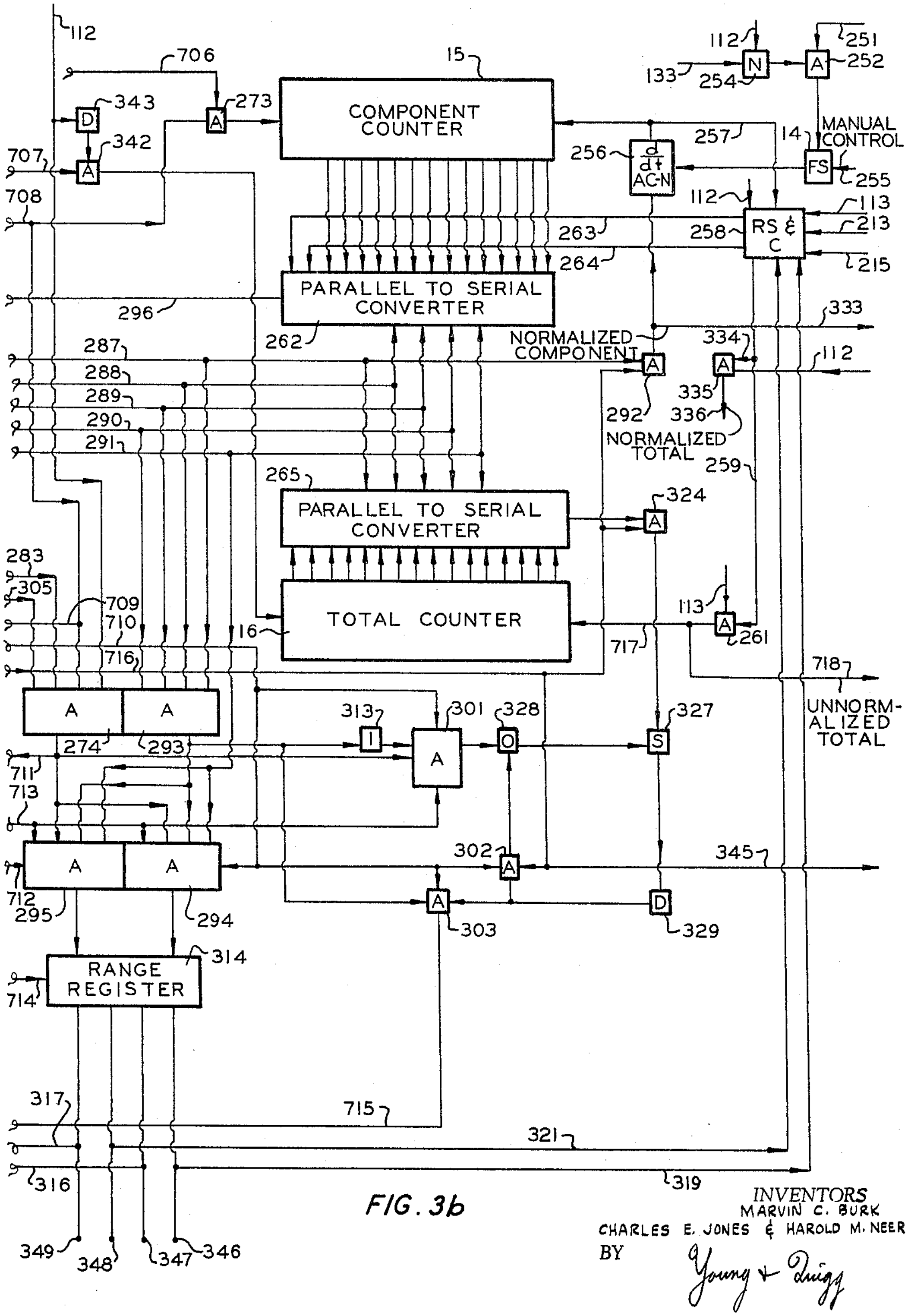

Referring now to FIGURE 3, the output of voltage to frequency converter 13 is applied through line 251 and "and" circuit 252 to an input of frequency scaler 14. A "$\overline{C}$" signal, which indicates a blank period in the chromatogram, is transmitted from programmer 12 through line 133 to a first input of "nor" circuit 254. An "N" signal or normalize gate is transmitted from programmer 12 through line 112 to a second input of "nor" circuit 254. The output of "nor" circuit 254 is applied to the second input of "and" circuit 252. Thus, the output of voltage-to-frequency converter 13 is applied to the input of frequency scaler 14 during those periods when analyzer 11 is producing a signal output, but is blocked by the "N" signal when computer 20 is normalizing the component signals and is also blocked during those periods corresponding to blank periods in the chromatogram to prevent the entry of stray pulses from the voltage to frequency converter.

Frequency scaler 14 can be any suitable counter such as a binary counter cascade and is used to divide the input frequency by a suitable factor to keep the pulse count at an appropriate range. Thus the scale factor can be manually or automatically adjusted through line 255 in steps over a suitable range such as in 9 steps from 1 to 256.

When received by normalizing computer 20 component peaks from the analyzer 11 have been converted to groups of serial pulses by voltage-to-frequency converter 13. The input frequency to scaler 14 is proportional to the signal so that the number of pulses appearing within a group represent the time integral of a component peak. The output of frequency scaler 14 is passed through A.C. "nor" circuit 256 to the input of component counter 15, wherein each component pulse group is counted. The output of A.C. "nor" circuit 256 is also transmitted through line 257 to range scale and control system 258. To permit closer resolution of small components, three component ranges of 100 percent, 10 percent and 1 percent can be provided. In using the 10 percent and 1 percent ranges the relative gain of the data amplifier 33 and consequently the output of voltage-to-frequency converter 13 is programmed to increase by a factor of 8 or 64, respectively. The input to total counter 16 must be scaled back down by the same factor when a 10 percent or 1 percent range has been used. This scaling function is performed by range scaler 258 and is controlled by two range code bits transmitted through lines 213 and 215 from the programmer 12. The rescaled signal output of range scaler 258 is transmitted through line 259 and "and" circuit 261 to the input of total counter 16. An "$\overline{N}$" signal is applied through line 113 to the second input of "and" circuit 261 to pass the input signal to total counter 16 only during transfer of component signals from analyzer 11 to computer 20 and to block the passage of signals during the normalizing operation of computer 20. Total counter 16 accumulates the integral of all components during an analysis. Component counter 15 and total counter 16 can be any suitable counters such as a cascade of binary counter modules BC–1 manufactured by Packard Bell Computer Corporation.

Each of the outputs of component counter 15 is applied to a respective input of parallel-to-serial converter 262. Range scaler and control system 258 transmits a two bit range signal through lines 263 and 264 to the two highest bit inputs of parallel-to-serial converter 262. Each of the outputs of total counter 16 is applied to a respective input of parallel-to-serial converter 265. Parallel-to-serial converters 262 and 265 can comprise diode gate circuits controlled by address and order counter 267 which sample in sequence each bit of component counter 15 and total counter 16, respectively, generating serial pulse patterns corresponding to the number contained at a particular time.

Computer operation is synchronized with a 200 kc. crystal clock generator 266 and a binary address and order counter 267 driven by the output of clock 266. The lower order outputs of address and order counter 267 control the parallel-to-serial conversion of the contents of component counter 15 and total counter 16, while the higher order outputs are used in the selection of addresses in storage 17. The six highest bits of address and order counter 267 are compared by comparator 268 with the five bits output of component number counter 269 and with the "E" function input to comparator 268 through cable 271 which forms a sixth bit. The "E" function selects the normalized or unnormalized address half of each component location. Component number counter 269 determines the component location in storage 17 to which data is transferred or from which it is removed. Component number counter 269 is reset at the beginning and end of each normalizing period. Each time the contents of component counter 15 are transferred to storage by an access gate, component number counter 269 is advanced one count for the next component location.

The output of comparator 268 is passed through inverter 272 to obtain the address gate "W," which appears for a 16 bit period in each memory cycle during which coincidence is obtained and is used to gate component data into and out of the proper word addresses.

The output of inverter 272 is applied to first inputs of "and" circuits 273, 274, and 275. Transfer of data to or from main storage 17 is accomplished by generating an access gate function, denoted as "A." Access gates are initiated by the leading edge of a true signal appearing at any one of the inputs to A.C. "nor" circuit 276. "N" and "$\overline{C}$" signals are applied from programmer 12 to A.C. "nor" circuit 276 through lines 112 and 133, respectively. The output of "nor" circuit 276 is applied to one input of flip flop circuit 277 to switch flip flop circuit 277 to the "set" state. The output of flip flop circuit 277 is then transmitted through "and" circuit 278 to "set" flip flop circuit 279. Flip flop circuit 279 is "set" and subsequently "reset" through "and" gate 278 by the highest order binary of the address and order counter 267 so that "A" is present for exactly one memory cycle, allowing data to be entered or removed from storage 17. The "A" output of flip flop circuit 279 is transmitted through line 281 to a first input of "and" circuit 282, to the reset input of flip flop circuit 277, and to a second input of "and" circuit 273. The "A" output of flip flop circuit 279 is also transmitted through line 283 to a first input of "and" circuit 284, to a second input of "and" curcuit 275, and to a second input of "and" circuit 274. The "A" output of flip flop circuit 279 is connected through line 285 to the reset input of flip flop circuit 286.

The five lower order outputs of address and order counter 267 are transmitted through cables 287, 288, 289, 290 and 291 with each cable containing a true line and a false line to respective inputs of parallel-to-serial converter 265 while the lines in cables 288–291 are connected to respective inputs of parallel-to-serial converter 262. The false line in cable 287 is also connected to one input of "and" circuit 292. The true lines of cables 287, 288, 289 and 290 are connected to respective inputs of "and" circuit 293 while the false line of cable 291 is connected to an input of "and" circuit 294 and the true line of cable 291 is connected to an input of "and" circuit 295. The output of component counter 15 is continuously converted from parallel-to-serial form by converter 262, and upon application of the proper control signals to "and" gate 275, the output of converter 262 is transmitted through line 296, "and" circuit 297, and "or" circuit 298 to main storage 17. When the contents of component counter 15 are transferred to storage, the two associated range bits are stored along with the component value in the same two highest order positions of the sixteen bit memory address.

The output of clock 266 is also transmitted as inputs to "and" circuits 294, 295, 297, 299, 301, 302 and 303. Thus, the cycles of the main storage 17 are synchronous with those of the address and order counter 267. The reset state output of flip flop circuit 286, which is designated as "$\overline{E}$" is transmitted through line 304 to one input of comparator 268, through line 305 to one input of "and" circuit 274, through line 306 to an input of "and" circuit 284, and through line 307 to an input of "and" circuit 308. An "N" signal is applied through line 112 to a second input of "and" circuit 308, the output of which is transmitted through inverter 309 to inputs of "and" circuits 275 and 282. The output of "and" circuit 275 is applied as an input to "and" circuit 297 and is also passed through inverter 311 to an input of "and" circuit 299. The output of "and" circuit 274 is applied through inverter 312 to an input of "and" circuit 299. The output of "and" circuit 299 is applied as an input to "or" circuit 298. The output of "and" circuit 274 is also applied as an input to "and" circuits 294, 295, and 301. The output of "and" circuit 293 is applied through an inverter 313 to an input of "and" circuit 301. The output of "and" circuit 293 is also applied as an input to "and" circuits 294, 295, and 303.

The output of main storage 17 is applied as an input to "and" circuits 294, 295, 299 and 301. The outputs of "and" circuits 294 and 295 are applied to inputs of range register 314. The output of "and" circuit 284 is applied through inverter 315 to reset range register 314. The "$\overline{1}$" and "$\overline{2}$" output of range register 314 are applied through lines 316 and 317 to first and second inputs of "and" circuit 318, respectively. The "1" and "2" outputs of range register 314 are applied through lines 319 and 321 to first and second inputs of range scaler and control system 258, respectively. The output of "and" circuit 318 is applied as an input to "and" circuit 322 and flip flop circuit 323. The "set" state output signal of flip flop circuit 323, which is designated as "S," is applied as an input to flip flop circuit 286 and "and" circuits 302, 324 and 292. The "reset" state output signal of flip flop circuit 323 is applied to an input of A.C. "nor" circuit 276. The "reset" state output of flip flop circuit 286 is also transmitted to an input of "and" circuit 325. A "ready" signal is transmitted from decimal readout unit 21 through line 326 to a second input of "and" circuit 325. The output of "and" circuit 325 is applied to an input of A.C. "nor" circuit 276.

The output of total counter 16 is transmitted to parallel-to-serial converter 265 wherein it is converted from parallel-to-serial pulse form. Upon the application of a control signal from address and order counter 267, the output of converter 265 is transmitted to an input of "and" circuit 324. The output of "and" circuit 324 is transmitted to the minuend input of subtractor 327. The output of "and" circuit 301 is transmitted through "or" circuit 328 to the subtrahend input of subtractor 327. The remainder output of subtractor 327 is transmitted through delay 329 to inputs of "and" circuits 302 and 303. The output of "and" circuit 302 is transmitted through "or" circuit 328 to the subtrahend input of subtractor 327. The output of "and" circuit 303 is transmitted to the reset input of flip flop circuit 323.

When the two highest order digits of the remainder output of the subtractor 327 become negative, "and" circuit 303 transmits a signal to the flip flop circuit 323 to switch flip flop circuit 323 to "reset" state, thus ending the "S" signal. The cessation of the "S" signal blocks "and" circuit 292. Since the subtraction operation is synchronized with the other operations by the output of clock 266, the output of "and" circuit 292, which is the number of time pulses transmitted through cable 287 during the occurrence of the "S" signal, is representative of the component as a percentage of the total of all of the components in the analysis. The output of "and" circuit 292 is transmitted through line 333 to decimal readout unit 21 for printing. The output of "and" circuit 292 is also applied through A.C. "nor" circuit 256 to the input of component counter 15.

The output of "and" circuit 292 is also transmitted through A.C. "nor" circuit 256 to an input of range scaler and control system 258 wherein the percentage values of each component are scaled (1, ⅛, and 1/64 according to the range) and then transmitted through line 334 to an input of "and" circuit 335. An "N" signal is applied through line 112 to a second input of "and" circuit 335. The output of "and" circuit 335 which represents the normalized total is transmitted through line 336 to decimal readout unit 21. The "reset" output of flip flop circuit 279, which is represented by "$\overline{A}$," is transmitted through line 337 and A.C. coupling network 338 to an input of "and" and circuit 322. An "N" signal is applied through line 112 to another input of "and" circuit 322. The output of "and" circuit 322 is a "read total" signal which is transmitted through line 339 to decimal readout unit 21 to cause the total to be printed.

"$\overline{N}$" and "N" signals are applied through lines 112 and 113 to first and second inputs, respectively, of A.C. "nor" circuit 341, the output of which is applied to component number counter 269 as a reset signal. The output of A.C. "nor" circuit 341 is also applied to an input of "and" circuit 342. An "N" signal is applied through line 112 and delay 343 to a second input of "and" circuit 342, the output of which is applied to total counter 116 as a reset signal. The outputs of range register 314, corresponding to 1, $\overline{1}$, 2, $\overline{2}$, are transmitted through lines 346, 347, 348 and 349, respectively, to decimal readout unit 21 as control signals.

Figure 4:
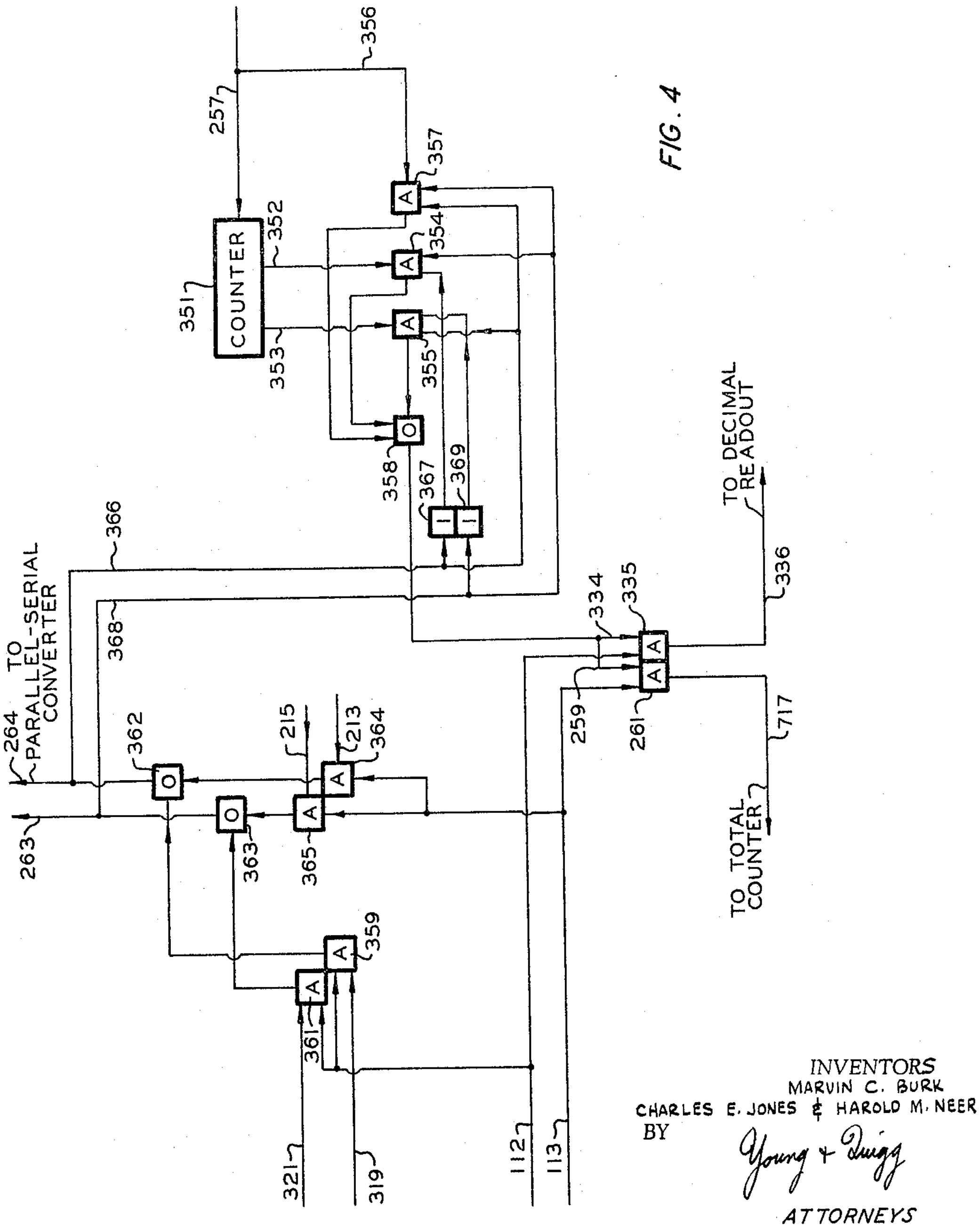
FIGURE 4 is a schematic representation of a range scaler and control system which can be utilized in the computer of FIGURE 3.

Referring now to FIGURE 4 there is shown a range scaler and control system which can be used in the system of FIGURE 3. The output of A.C. "nor" circuit 256 is transmitted through lines 257 to an input of counter 351. Counter 351 can be any suitable conventional counter, such as a cascade of binary counter module BC–1 manufactured by Packard Bell Computer Corporation, and is preferably a six bit binary counter. Counter 351 has two outputs which correspond to a ratio of ⅛ and 1/64 of the input and are transmitted through lines 352 and 353 to "and" circuits 354 and 355, respectively. The output of A.C. "nor" circuit 256 is also connected through line 356 to an input of "and" circuit 357. "And" circuits 355, 354 and 361, respectively. An "N" signal is applied through cent ranges, respectively. The outputs of "and" circuits 355, 354 and 357 are applied to inputs of "or" circuit 358, the output of which is applied through lines 334 and 259 as inputs to "and" circuits 335 and 261, respectively.

A range signal from range register 314 is transmitted through lines 319 and 321 to inputs of "and" circuits 359 and 361, respectively. An "N" signal is applied through line 112 to inputs of "and" circuits 335, 359 and 361 while a "$\overline{N}$" signal is applied through line 113 to inputs of "and" circuits 261, 364 and 354. The outputs of "and" circuits 359 and 361 are applied as inputs to "or" circuits 362 and 363, respectively. A range signal from programmer 12 is applied through lines 213 and 215 to inputs of "and" circuits 364 and 365, respectively. The outputs of "and" circuits 261, 364 and 354. The outputs of "and" circuits 362 and 363, respectively. The outputs of "or" circuits 362 and 363 are applied through lines 264 and 263, respectively, to the two highest bit inputs of parallel-to-serial converter 262. The output of "or" circuit 362 is applied through line 366 to inputs of "and" circuits 355 and 357 and through inverter 367 to an input of "and" circuit 354. The output of "or" circuit 363 is applied through line 368 to inputs of "and" circuits 354 and 357 and through inverter 369 to an input of "and" circuit 355.

Thus, when the output of A.C. "nor" circuit 256 represents a component signal at 100 percent range, signals are transmitted through lines 213 and 215 to circuits 364 and 365 which are gated by the "$\overline{N}$" signal to pass the range signals to "or" circuits 362 and 363, which in turn pass the range signals through lines 366 and 368 to "and" circuits 355, 354 and 357, blocking "and" circuits 355 and 354 and passing the input signal applied to "and" circuit 357. The output of "and" circuit 357 is passed through "or" circuit 358 to "and" circuit 261 which is gated by the "$\overline{N}$" signal to pass the input signal to total counter 16. When the output of A.C. "nor" circuit 256 represents a component signal at a 10 percent range, the range signal is applied through line 215 to "and" circuit 265 which is gated by "$\overline{N}$" signal to pass the input to "or" circuit 363. The output of "or" circuit 363 is transmitted through line 368 to an input of "and" circuit 354. The input to "and" circuit 364 from line 213 is "zero" and thus the input to inverter 367 is "zero." However, the output of inverter 367 is a true signal which is transmitted to a second input of "and" circuit 354 to pass the input from line 352 representing ⅛ of the input to binary counter 351 through "or" circuit 358 and "and" circuit 261 to total counter 16. Similarly, when the output of A.C. "nor" circuit 256 represents a component signal at 1 percent range, the input to "and" circuit 364 through line 213 is true while the input to "and" circuit 365 through line 215 is false. Thus, "and" circuit 355 is gated to pass the input from line 353, which represents 1/64 of the input to counter 351, through "or" circuit 358 and "and" circuit 261 to total counter 16 while "and" circuits 354 and 357 are gated closed.

During the normalizing operation in computer 20 the range signal is transmitted from range register 314 to "and" circuits 359 and 361 and a "N" signal is utilized to gate "and" circuits 335, 359 and 361. The range signal from range register 314 determines which one of "and" circuits 357, 354 and 355 will be gated to pass the input signal through "and" circuit 335 and line 336 to decimal readout unit 21.

Figure 5:
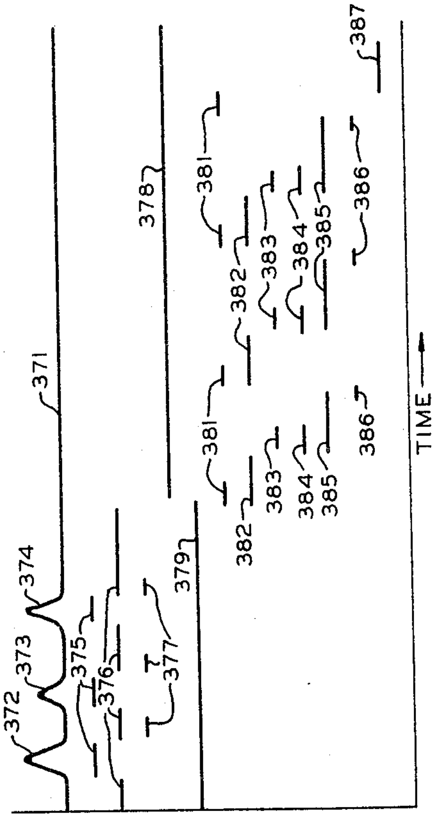
FIGURE 5 is a time diagram of the operating signals of the computer of FIGURE 3.

Referring now to FIGURE 5 there is shown a timing diagram for the operation of normalizing computer 20. Curve 371 represents the output of analyzer 11 with peaks 372, 373 and 374 representing different components. Lines 375 represent the occurrence of a "component" signal which corresponds to the presence of component peaks, such as 372, 373 and 374 in the output of analyzer 11. Immediately after each component peak has appeared from the chromatogram, a "$\overline{C}$" pulse, represented by lines 376, is applied from programmer 12 through line 333 to A.C. "nor" circuit 276 to generate an access gate represented by lines 377 to transfer the output of component counter 15 to storage 17. If it is desired to skip certain component peaks in the analyzer output, the corresponding "component" signal 375 can be omitted and the "$\overline{C}$" signal can be programmed to block the passage of the undesired component peak to computer 20. The "$\overline{C}$" signal also blocks the entry of stray pulses from voltage-to-frequency converter 13 during blank periods in the chromatogram. The "N" or normalizing gate, represented by the line 378 is programmed to appear after all components have been received and stored and to remain until the beginning of the following analysis cycle. The "$\overline{N}$" gate, represented by line 379, appears only during the absence of the "N" gate. The appearance of "N" gate 378 generates an access gate, represented by line 381, which transfers the first component to the subtraction unit 327 to begin the normalization cycle. The "N" gate is also used at a number of other points in the control logic of computer 20.

When the first unnormalized component is read into subtractor 327 from main storage 17, it recirculates through 32 bit delay 329 and subtractor 327 forming the minuend for the subtraction. The component in unnormalized position lags the total in time by 13 bit positions, or has in effect been multiplied by $2^{13}$ or 8192, with respect to the total. The total value is then subtracted off once each cycle of the 32 bit delay until the component has been reduced to zero, and the number of subtractions required is represented by the number of time pulses transmitted through the false line of cable 287 to "and" circuit 292. This operation may be represented by:

$$(8192)\ (\text{component}) - n(\text{total}) = 0$$

or $$n = \text{required subtractions} = 8192\left(\frac{\text{component}}{\text{total}}\right)$$

When an unnormalized component is transferred to the subtractor 327, the two highest order range bits are gated off through "and" gates 294 and 295 to set one or both of the flip flops in range register 314 according to the range which was programmed for the particular component. Only the 14 component value bits are allowed to enter the subtractor 327, so that the two range bit positions initially contain zeros. When a bit appears in range register 314, flip flop circuit 323 is switched to "set" state and an "S" or subtract gate, represented by lines 382 in FIGURE 5, is obtained. While the "S" gate is present a pulse is passed through "and" gate 292 for each subtraction of the total. These pulses are counted by component counter 15 and can be returned to storage 17 upon the appearance of an access gate indicated by lines 383 and an "E" signal indicated by lines 384. The "E" signal 384 selects the normalized address in storage 17 while the appearance of the "$\overline{E}$" signal selects the unnormalized address in storage 17. The output of "and" circuit 292 is also transmitted through line 333 to the decimal readout unit 21 to be re-scaled, counted, and typed out as a percentage.

To end the "S" gate at the proper time, the two vacant range bits are sampled once each cycle of delay 329 at "and" gate 303, and when the component has been reduced to zero and goes negative 1's appear in the range bit positions and are used to switch flip flop circuit 323 to the "reset" position to end the "S" gate. As a check on computer operation, either the unnormalized or normalized total can be transmitted through decimal readout unit 21 to be counted and typed out after all components have been normalized. The unnormalized total is the number which is accumulated in total counter 16 and its value indicates whether the frequency scaler 14 has been properly adjusted. The normalized total is equal to:

$$8192\left(\frac{\sum \text{components}}{\text{total}}\right)$$

and any substantial deviation from 8192 would indicate faulty operation. The "S" signal is applied through line 345 to decimal readout unit 21 wherein the trailing edge of the "S" signal is utilized as a "component gate" control signal, represented by lines 385.

After each component percentage is typed out by decimal readout unit 21, a "$\overline{D}$" pulse, represented by lines 386, is transmitted through line 326 and "and" circuit 325 to A.C. "nor" circuit 276 to generate an access gate and continue the normalizing operation. If a particular analysis is not being typed, the "$\overline{D}$" signal is present so that an access gate will be generated instead by the leading edge of the "$\overline{E}$" signal.

After all components have been normalized and stored, the next unnormalized storage address will be found vacant and the range register 314 will not be set. A "read total" pulse, represented by line 387, is then generated by the trailing edge of the final access gate and is allowed to pass through "and" gate 339 to the decimal readout unit 21.

Main storage 17 can be any suitable delay such as a magnetostrictive delay line through which the stored contents recirculate each 5120 microseconds. Each normalized component value and its associated range code can be stored in the first sixteen bit address at each location, and the unnormalized component and its associated range code can be stored in the second sixteen bit address at each location. The unnormalized data can be erased from storage at the time of transfer to subtractor on 327, while normalized data can be erased as it is replaced by that from the next analysis.

Figure 6:
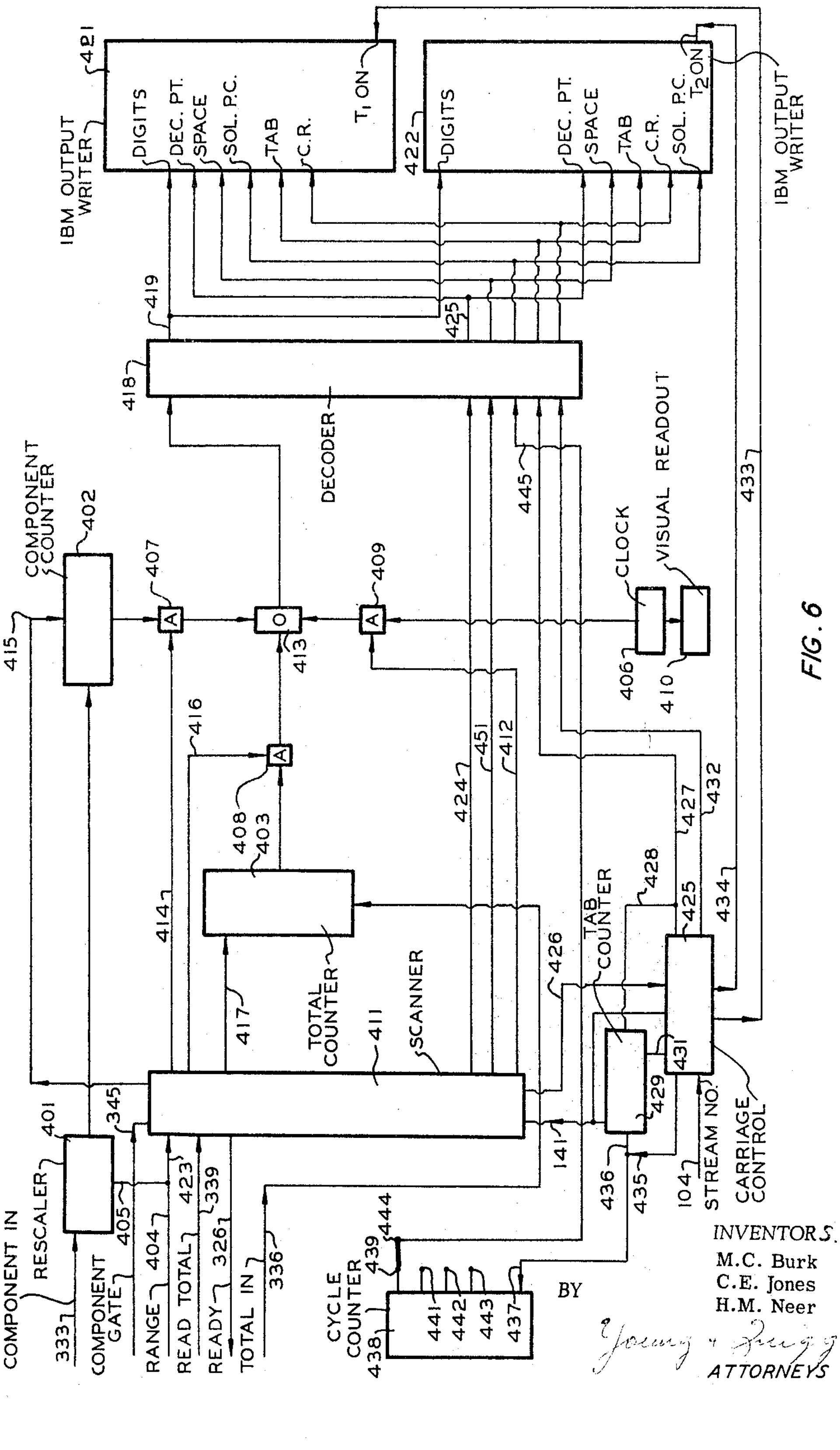
FIGURE 6 is a schematic representation of a decimal readout system which can be utilized in the system of FIGURE 1.

Referring now to FIGURE 6 the normalized component output of computer 20 is in serial pulse form and is transmitted through line 333 and rescaler 401 to component counter 402. The serial pulse output of computer 20 is also transmitted through line 336 to total counter 403. Component counter 402 and total counter 403 can be any suitable conventional counters, such as an array of DC–1 decade counter modules manufactured by Packard Bell Computer Corporation. The DC–1 counter modules comprise four flip flop circuits gated to count from zero through nine in the 8–4–2–1 binary coded decimal code.

In many applications it is desirable for convenience in the construction and operation of computer 20 to utilize some suitable power of 2, such as 8192, pulses as full scale value. Rescaler 401 can be utilized to add additional pulses to the serial pulse output of computer 20 in order to obtain the base of 10,000 pulses as full scale value for component counter 402 to make the output of component counter 402 a percentage after insertion of a decimal point. If it is desired to utilize more than one range, a range signal can be transmitted from computer 20 through lines 346, 347, 348 and 349, represented by cables 404 and 405, to rescaler 401. The range factor is applied as an input to rescaler 401 to reconvert the component signals to 10,000 full scale.

A clock 405 can be provided to furnish a time-of-day signal which can be printed with the recording of each analysis. A visual readout 407 can be provided to enable the operator to determine the setting of clock 405.

The outputs of component counter 402, total counter 403, and clock 405 appear in parallel binary-coded-decimal form and are transmitted to "and" circuits 407, 408 and 409 respectively. A scanner 411 is provided to scan the outputs of the component counter 402, total counter 403, and clock 405 for the purpose of selecting one of the output signals for recording. When scanner 411 is ready for operation, the scanner is set for component readout and a "ready" signal is transmitted through line 326 to computer 20. When computer 20 begins to transmit the signals of an analysis to decimal readout 19, an "S" signal is transmitted from computer 20 through line 345 to scanner 411, the length of the "S" signal being equivalent to the time required for the pulses representing the respective component. The trailing edge of the "S" signal acts as a "component gate" control signal for scanner 411. Prior to the receipt of the "component gate" signal corresponding to the first component, scanner 411 produces a "time readout" signal which is transmitted through cable 412 to "and" circuit 409. Upon the application of a signal to "and" circuit 409 through cable 412, "and" circuit 409 passes the output of clock 405 to "or" circuit 413. When the pulses corresponding to a component have been counted by component counter 402, the "component gate"

signal from computer 20 being transmitted through line 345 terminates, causing scanner 411 to transmit an output signal through cable 414 to "and" circuit 407. Upon the occurrence of an input to "and" circuit 407 from both component counter 402 and scanner 411, "and" circuit 407 passes the output of component counter 402 to "or" circuit 413. After the output signal of component counter 402 has been transmitted to "or" circuit 413, scanner 411 produces a reset signal which is transmitted along line 415 to component counter 402 to reset component counter 402 to zero. At the conclusion of an analysis a "read" total signal is transmitted from computer 20 through line 339 to scanner 411 which in turn transmits a gating signal through cable 416 to "and" circuit 408. Upon the application of a gating signal to "and" circuit 408 through cable 416, "and" circuit 408 passes the output signal of total counter 403 to "or" circuit 413. After the output signal of total counter 403 has been transmitted to "or" circuit 413, scanner 411 produces a reset signal which is transmitted along line 417 to total counter 403 to reset counter 403 to zero.

"Or" circuit 413 passes the outputs of "and" circuits 407, 408 and 409, as each appears, to decoder 418. Decoder 418 converts the output of "or" circuit 413, which is in binary-coded-decimal form, into a 10-line serial pulse form, one digit at a time, which is then transmitted through 10 individual lines, shown schematically as cable 419 in the drawing, to automatic typewriters 421 and 422. Each of the individual lines corresponds to a decimal number.

A range factor corresponding to each component is transmitted from computer 20 through cables 404 and 423 to scanner 411 wherein it is utilized to select the proper positioning of the decimal point in the respective component percentage recording. Scanner 411 transmits a decimal point control signal through line 424 to decoder 418. Decoder 418 transmits a decimal point signal at the proper time through line 425 to typewriters 421 and 422.

Carriage control 425 is provided to control the position of the carriages of typewriters 421 and 422. If it is desired to analyze more than one stream, programmer 12 transmits a signal respresenting the stream being analyzed through line 104 to carriage control 425.

In multiple stream operation, after the total of each stream analysis is printed, scanner 411 produces a "tab" signal which is transmitted along line 426 to carriage control 425. Carriage control 425 then passes a "tab" signal through line 427 to position the carriage of the typewriter to be operated to correspond with the next stream to be analyzed. Each "tab" signal that is transmitted along line 427 is also transmitted along line 428 to tab counter 429 wherein the total number of "tab" signals is registered. Carriage control 425 can be provided with a stream selection control so that a certain stream can be repeatedly analyzed without sequencing through all of the streams being analyzed in a multiple stream analysis. When carriage control 425 is utilizing the stream selection control, a comparision is made between the "stream number" signal transmitted from programmer 12 to carriage control 425 along line 104 with the output of the counter 429 which is transmitted to carriage control 425 along line 431. If the normal stream sequence is being followed the output of tab counter 429 and the "stream number" signal on line 104 will be equal and carriage control 425 will not produce any additional "tab" signals. However, if it is desired to skip the next stream, the output of tab counter 429 and the "stream number" signal on line 104 will not be equal and carriage control 425 will produce additional "tab" signals to be transmitted along line 427 until equality between the tab counter output and the "stream number" signal is achieved.

When the total of the last stream for a given typewriter is printed or such last stream has been skipped, carriage control 425 produces a "carriage return" signal which is transmitted along line 432 to the respective typewriter to reposition the typewriter carriage for the next cyle.

In multiple stream operations where two or more typewriters are required or are desired, carriage control 425 actuates the proper typewriter by passing a "on-off" signal along line 433 or line 434 to typewriter 421 or 422, respectively. At the conclusion of the analysis of the last stream, carriage control 425 produces an output signal which is transmitted along lines 435 and 436 to reset tab counter 429 to zero. The output signal is also transmitted along lines 435 and 437 to the input of cycle counter 438. Cycle counter 438 has a plurality of outputs 439, 441, 442 and 443 with each output being a fraction of the input C to cycle counter 438. Thus, outputs 439, 441, 442, and 443 can be, for example, C, C/2, C/4, and C/8. Thus in applications where it is desirable to print data less frequently than the analyses are made, switch 444 can be set to the output of cycle counter 438 corresponding to the desired ratio of cycles to be printed. Thus, if it is desired to print only every fourth cycle, switch 444 could be set to output terminal 442. The signal applied to switch 444 is transmitted along line 445 to typewriters 421 and 422 to inhibit printing except during the desired data cycles.

Figure 7:
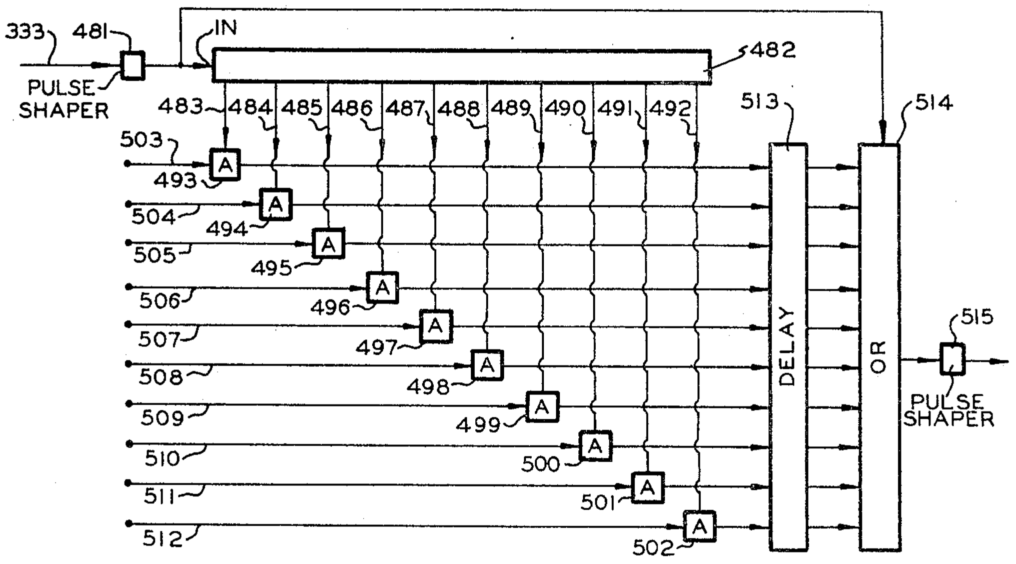
FIGURE 7 is a schematic representation of a rescaler which can be utilized in the decimal readout system of FIGURE 6.

Referring now to FIGURE 7 there is shown a rescaler system which is suitable for utilization in the system of FIGURE 6. The serial pulse input is applied through line 333 and pulse shaper 481 to the input of counter 482, which can be any suitable counter, such as a cascade of BC–1 binary counter modules manufactured by Packard Bell Computer Corporation. Binary counter 482 has a plurality of output terminals, 483, 484, 485, 486, 487, 488, 489, 490, 491 and 492. To obtain better resolution of smaller components three ranges of 100 percent, 10 percent and 1 percent can be utilized with a full scale output from computer 20 being represented on a 100 percent range by a suitable number such as 8192 serial pulses. Since range changes in the computer 20 are desirably associated with binary register shifts, factors of 8 rather than 10 can be used in that portion of the system so that on the 10 percent range the component size will be decreased by 10 while the relative output will be increased by 8 giving $8192\times(8/10)$ or 6553.6 pulses as full scale on the 10 percent range. Similarly, full scale on the 1 percent range will be $8192\times(8/10)\times(8/10)$ or 5242.88 pulses.

For convenience in converting the output of component counter 402 to percentage form it is desirable that the input to component counter 402 have a full scale value of 10,000 pulses. Thus, it is necessary to rescale each of the 100 percent, 10 percent and 1 percent full scale values to 10,000. A signal appears on ouput terminal 483 for every other signal received as an input to counter 482. Similarly a signal appears on terminal 484 for every fourth input signal, on terminal 485 for every eighth input signal, on terminal 486 for every sixteenth input signal, on terminal 487 for every thirty-second input signal, on terminal 488 for every sixty-fourth input signal, on terminal 489 for every 128th input signal, on terminal 490 for every 512th input signal, on terminal 491 for every 1024th input signal, and on terminal 492 for every 2048th input signal. Output terminals 483–492 are connected to "and" circuits 493–502, respectively.

A range signal is transmitted from computer 20 to rescaler 401 to apply a signal to terminals 503, 508, 510 and 512 for every 100 percent range; to apply a signal to terminals 504, 505, 507, 509 and 512 for a 10 percent range; and to apply a signal to terminals 504, 506, 508, 510 and 511 for a 1 percent range. The signals applied to terminals 503–512 are applied as inputs to "and" circuits 493–502, respectively. When the application of a signal to an "and" circuit from its respective output of counter 482 and from its respective range input terminal occurs, a pulse is passed to delay 513 wherein it is stored for a short time to provide minimum spacing between pulses in the input to component counter 402 and then applied to "or" circuit 514. The output of pulse shaper 481 is also applied as an input to "or" circuit 514. Upon the application of a pulse to any of the inputs of "or" circuit 514 an output pulse is transmitted through pulse shaper 515 to component counter 402.

Figure 8:
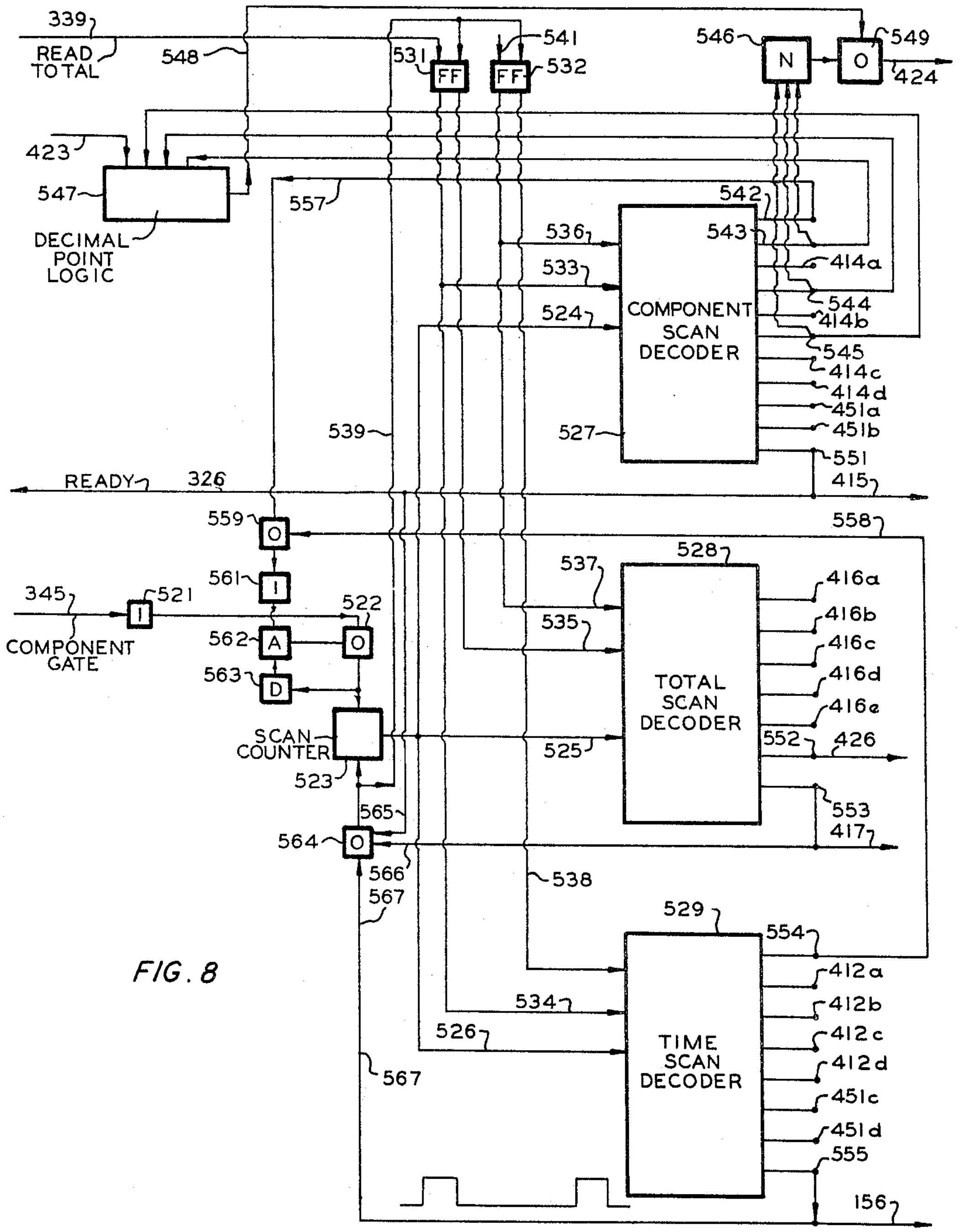
FIGURE 8 is a schematic representation of a scanner system which can be utilized in the system of FIGURE 6.

Referring now to FIGURE 8 there is shown a scanner system which can be utilized in the system of FIGURE 6. The "component gate" signal is transmitted through line 345, inverter 521, and "or" circuit 522 to scan counter 523. Scan counter 523 can be any suitable conventional counter such as a BC–1 binary counter, manufactured by Packard Bell Computer Corporation.

Upon actuation by the output of "or" circuit 522, scan counter 523 is advanced at a suitable rate, such as 5–8 counts per second. Scan counter 523 normally rests in the "zero" position but when advanced to the "one" position by a "start scan" signal from "or" circuit 522, will free run at the scan rate until reset to "zero." The output of scan counter 523 comprises the individual outputs of four separate flip flop circuits, each of which is transmitted along cables 524, 525, and 526 to component scan decoder 527, total scan decoder 528 and time scan decoder 529, respectively. Each of decoders 527, 528 and 529 comprises an array of "nor" circuits. The first position output of flip flop circuit 531 is transmitted along lines 533 and 534 to component scan decoder 527 and time scan decoder 529, respectively. The second position output of flip flop circuit 531 is transmitted along line 535 to total scan decoder 528. The first position output of flip flop circuit 532 is transmitted along lines 536 and 537 to component scan decoder 527 and total scan decoder 528, respectively. The second position output of flip flop circuit 532 is transmitted along line 538 to time scan decoder 529. Only the scan decoder receiving a "false" input signal from both flip flop circuits 531 and 532 will be actuated; the other two scan decoders will receive a "true" signal from one of the flip flop circuits and a "false" signal from the other flip flop circuit and will remain in a deactuated state. Flip flop circuit 531 is actuated to a first state by a "read total" input signal transmitted from computer 20 along line 339 and is actuated to a second state by a reset signal transmitted along line 539. Flip flop circuit 532 is actuated to a first state by a "time set" signal transmitted along line 541, and is actuated to a second state by the reset signal transmitted along line 539.

Component scan decoder 527 produces an output at terminal 542 when component scan decoder 527 is in the "zero" or rest position. Output terminals 543, 544 and 545 correspond to the decimal position for the 1 percent, 10 percent and 100 percent ranges, respectively. Output terminals 543, 544 and 545 are connected to respective inputs of "nor" circuit 546 and also to the respective input terminals of decimal point logic 547. Decimal point logic 547 compares the range input signal transmitted along cable 423 with the scanning position of scan decoder 527 and produces an output corresponding to the correct position of the decimal point which is transmitted along line 548 to "nor" circuit 549. The output of "nor" circuit 546 is applied to an input of "nor" circuit 549 with the output of "nor" circuit 549 being transmitted along line 424 to decoder 418. The output signals on terminals 414*a*, 414*b*, 414*c* and 414*d* correspond to the first, second, third and fourth digits, respectively, and are transmitted along cable 414 to "and" circuit 407. The outputs on terminals 451*a* and 451*b* result in causing the typewriter to space between component readouts. A signal appears on output terminal 551 at the conclusion of the component scan decoding operation and is transmitted along line 415 to reset component counter 402. The output signal at terminal 551 is also transmitted along line 326 as a "ready" signal to computer 20.

Output signals on terminals 416*a*, 416*b*, 416*c*, 416*d* and 416*e* correspond to the five digits of total counter 403 and are transmitted along cable 416 to "and" circuit 408. The output on terminals 552 corresponds to the "tab" signal which is transmitted along line 426 to carriage control 425. An output is applied to terminal 553 at the conclusion of the readout of the total counter 403 and is transmitted along line 417 to reset total counter 403. An output is applied to terminal 554 when the time scan decoder is at "zero" or rest position. The outputs on terminals 412*a*, 412*b*, 412*c* and 412*d* correspond to the four digits on the readout of clock 406 and are transmitted along cable 412 to "and" circuit 409. The outputs on terminals 451*c* and 451*d* are transmitted along cable 451 causing the typewriter to space after the printing of the time. A signal is applied to terminal 555 at the conclusion of the readout of the time from clock 406.

The "scan rest" signals on terminals 542 and 554 are transmitted along lines 557 and 558 to "or" circuit 559. The output of "or" circuit 559 is transmitted through inverter 561 to "and" circuit 562. The output of "or" circuit 522 is passed through delay 563 to a second input of "and" circuit 562. The output of "and" circuit 562 is applied as an input to "or" circuit 522. Delay 563 and "and" circuit 562 in combination with the inverted "scan rest" signals appearing at terminals 542 and 554 thus constitute a system for maintaining the stepping of scan counter 523 until the scanning operation has been completed.

Reset terminals 551, 553 and 555 are connected to the inputs of "or" circuit 564 through lines 565, 566 and 567, respectively. The output of "or" circuit 564 is applied as a reset signal to scan counter 523 to reset the scan counter to zero.

Figure 9:
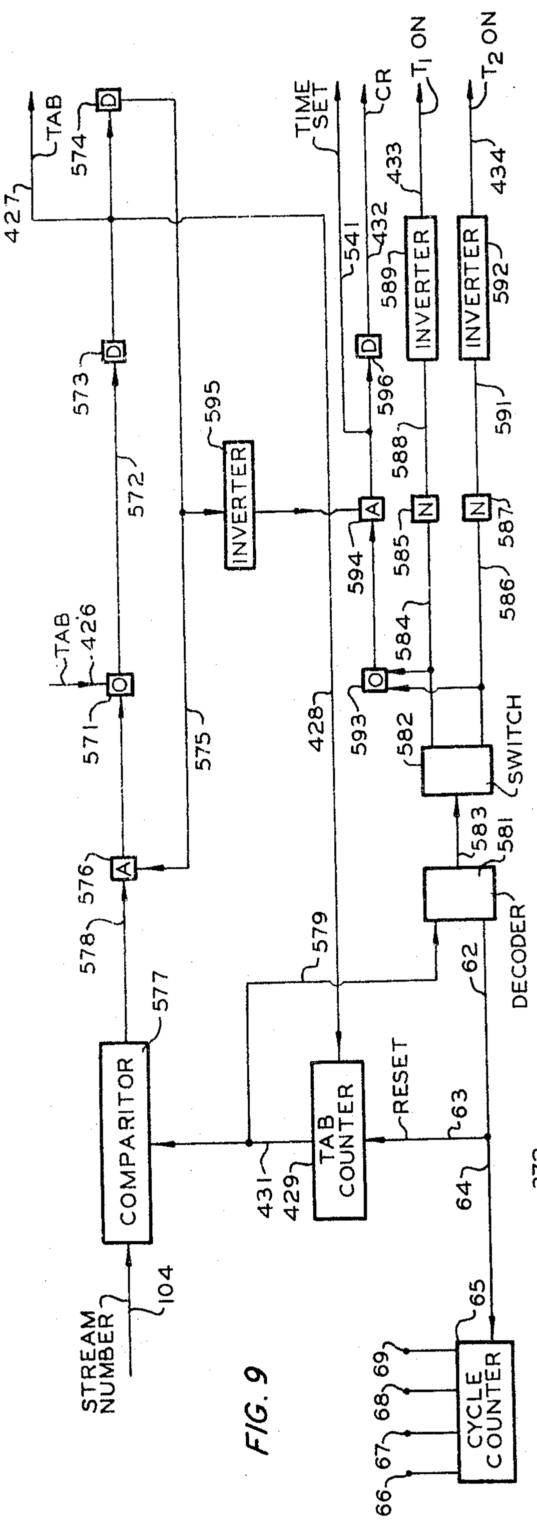
FIGURE 9 is a schematic representation of a comparitor and carriage control logic system which can be utilized in the system of FIGURE 6.

Referring now to FIGURE 9 there is disclosed a carriage control system which is suitable for utilization in the system of FIGURE 6. At the completion of the readout of total counter 403 a "tab" signal is obtained from terminal 552 of total scan decoder 528 and transmitted along line 426 to "or" circuit 571. The output of "or" circuit 571 is transmitted through line 572, delay 573 and line 427 to the typewriter being operated. The output of delay 573 is transmitted through line 428 to tab counter 429 which registers the number of tab signals. The output of delay 573 is transmitted through delay 574 and line 575 to "and" circuit 576. In a multiple stream analysis operation utilizing a stream selection control, the output of tab counter 429 is transmitted through line 431 to an input of comparator 577. Comparator 577 compares the "stream number" signal on line 104 with the output of tab counter 429 and if they are not equal, an output signal is transmitted through line 578 to "and" circuit 576. Thus a tab signal is transmitted along line 427 at the completion of the readout of total counter 403 and also for streams to be omitted under the direction of the stream selection control.

The output of tab counter 429 is transmitted through line 579 to decoder 581 which comprises an array of "nor" circuits. In operations utilizing more than one typewriter, switch 582 is employed to transfer the output of decoder 581 to the respective typewriter control. The multiple output of decoder 581 is thus passed through cable 583, switch 582, and cable 584 to "nor" circuit 585; or through cable 583, switch 582 and cable 586 to "nor" circuit 587. The output of "nor" circuit 585 is passed through line 588, and inverter 589 and line 433 to the on-off control of typewriter 421. The output of "nor" circuit 587 is transmitted through line 591, inverter 592, and line 434 to the on-off control of typewriter 422. One of the output lines in cable 584 is connected to one input of "or" circuit 593, and one of the output lines in cable 586 is connected to a second input of "or" circuit 593. The output of "or" circuit 593 is connected to an input of "and" circuit 594. The output of delay 574 is connected through an inverter 595 to a second input of "and" circuit 594. The output of "and" circuit 594 is transmitted through line 541 to one input of flip flop circuit 532 in scanner 411. The output of "and" circuit 594 is also transmitted through delay 596 and line 432 to the carriage return controls in typewriters 421 and 422.

Figure 10:
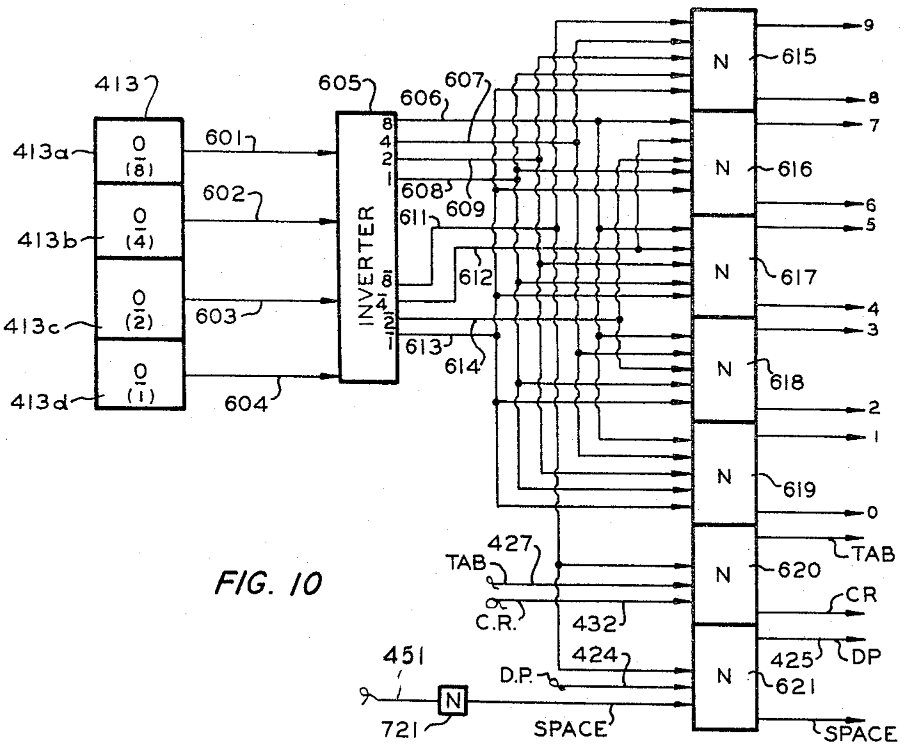
FIGURE 10 is a schematic representation of a decoding system which can be utilized in the system of FIGURE 6.

Referring now to FIGURE 10 there is shown a decoding circuit which is suitable for utilization in the system of FIGURE 6 and which will be described as decoder 418. "Or" circuit 413 comprises a cascade of four individual "or" circuits 413*a*, 413*b*, 413*c* and 413*d* the outputs of which represent $\bar{8}$, $\bar{4}$, $\bar{2}$, and $\bar{1}$ where the bar above the number signifies that that number is not present. The output of "or" circuits 413*a*, 413*b*, 413*c* and 413*d* are transmitted through lines 601, 602, 603 and 604, respectively, to inverter 605 wherein it is inverted once and applied to output terminals 606, 607, 608 and 609, respectively. The signals appearing on lines 601, 602, 603 and 604 are inverted twice and applied to output terminals 611, 612, 613 and 614 respectively. The term "inverted" is used to signify that a false signal has been changed to a true signal and similarly a true signal has been changed to a false signal. Output terminals 606, 607, 608, 609, 611, 612, 613 and 614 are connected to selected input terminals of "nor" circuits 615, 616, 617, 618, 619, 620 and 621. Each of the "nor" circuits comprises two "nor" gates having corresponding outputs. Thus "nor" circuit 615 has outputs corresponding to the decimal number 9 and to the decimal number 8. The upper three input terminals in "nor" circuits 615–619 are common to both of the "nor" gates in each respective "nor" circuit with each of the remaining two input terminals being connected to only one of the "nor" gates. The outputs of "nor" circuits 615–619 are transmitted through cable 419 to typewriters 421 and 422 to cause the print out of the respective decimal number by the typewriter which is being operated. Tab signal and carriage return signals are applied through lines 427 and 432 to "nor" circuit 620 while decimal point and space signals are applied through lines 424 and 451 to "nor" circuits 621 and 721, respectively. The output of "nor" circuit is applied as an input to "nor" circuit 621. "Nor" circuit 721 is provided to give a false signal at the input to "nor" circuit 621 for a true signal on terminals 451*a*, 451*b*, 451*c*, or 451*d*. If all of the signals to a "nor" gate are false (zero volts) the "nor" gate will produce an output, but if any one of the inputs to the "nor" gate is true the output of the "nor" gate will be zero.

The particular details of the timing means of FIGURE 2 are the claimed subject matter of copending application Serial No. 174,543, filed February 20, 1962, by Marvin C. Burk and Charles E. Jones. The particular details of the decimal readout system of FIGURES 6–10 are the claimed subject matter of copending application Serial No. 174,614, filed February 20, 1962, by Harold M. Neer.

Reasonable variation and modification are possible within the scope of the disclosure, the drawing, and the appended claims to the invention.

We claim:

1. Apparatus for recording the output of an analyzer for selected analyses of a plurality of analyses wherein the analyzer output for each analysis comprises a plurality of component signals in sequence, each of said component signals being representative of a respective component of a material being analyzed; comprising, means for measuring each of said component signals; means for measuring the total of the component signals for each analysis; means, connected to the outputs of said means for measuring each of said component signals and said means for measuring the total of the component signals for each analysis, for producing a series of pulses representing each component signal as a percentage of said total of the component signals for the particular analysis; a first counter; means for applying the output of said means for producing a series of percentage pulses to an input of said first counter; a second counter; means for applying the output of said means for measuring the total to an input of said second counter; clock means for producing a time signal; first, second, and third "and" circuits; means for applying the outputs of said first counter, said second counter and said clock means to first inputs of said first, second, and third "and" circuits, respectively; means for transmitting a first gating pulse to a second input of said first "and" circuit corresponding to the termination of each of said series of pulses; means for transmitting a second gating pulse to a second input of said second "and" circuit subsequent to the termination of the first gating pulse corresponding to the last component of each analysis; means for transmitting a third gating pulse to a second input of said third "and" circuit at the beginning of each analysis cycle; an "or" circuit; means connecting the outputs of said first, second, and third "and" circuits to respective inputs of said "or" circuit; means for converting the output of said "or" circuit into a 10-line serial pulse output; an automatic typewriter; means for applying the output of said means for converting corresponding to the analyses which are to be recorded to an input of said typewriter; and means for blocking the output of said means for converting corresponding to the analyses which are not to be recorded.

2. Analysis apparatus comprising:

(1) an analyzer adapted to provide a plurality of output voltages in sequence, each output voltage being representative of a component of the material being analyzed;

(2) timing apparatus comprising a plurality of radiation sources; a plurality of radiation detectors; a coded means containing a plurality of code rows, each of said code rows being divided into a plurality of code areas, at least one code area in each of said code rows containing a hole; the position of a code row with respect to a reference position determining the time the respective operation occurs, while the combination of holes in a code row determines which operation occurs; said coded means being positioned between said radiation sources and said radiation detectors in such a manner that the code areas of a code row in a reading position will be in alignment with their respective radiation sources and their respective radiation detectors; means for moving said coded means past said reading position; means for controlling said means for moving to vary the speed of movement; and means for variably attenuating each of the output voltages of said analyzer responsive to the output of said plurality of radiation detectors;

(3) means for converting each of the thus attenuated output voltages of said analyzer into a fluctuating output signal, each said fluctuating output signal comprising a series of pulses having a frequency which is proportional to the amplitude of the respective attenuated output voltage of said analyzer;

(4) computing apparatus comprising first and second counting means; means for applying all of the output signals of said means for converting to said first counting means to register a value proportional to the number of pulses in the total output of said means for converting; means for applying in sequence individual output signals from said means for converting to said second counting means to register a value proportional to the number of pulses in the respective output signal from said means for converting; storage means for separately storing the individual output signals of said second counting means; means for transferring in sequence each of the individual output signals of said second counting means to said storage means; subtracting means; means for transferring the output of said first counting means to the minuend input of said subtracting means; means for transferring in sequence each of said individual output signals from said storage means to the subtrahend input of said subtracting means; and means for producing a plurality of percentage signals, each being representative of the number of times the respective individual output signal from said storage means can be subtracted from said output of said first counting means; and (5) recording means comprising, a component counter; means for applying each of said percentage signals to an input of said component counter in sequence; a total counter; means for applying the output of said first counting means to an input of said total counter; first and second "and" circuits; means for applying the outputs of said component counter to an input of said first "and" circuit; means for applying the output of said total counter to an input of said second "and" circuit; an "or" circuit; means for applying the outputs of said first and second "and" circuits to respective inputs of said "or" circuit; signal conversion means to produce an output which is suitable for controlling an automatic typewriter; means for applying the output of said "or" circuit to an input of said signal conversion means; an automatic typewriter; means for applying the output of said signal conversion means to an input of said automatic typewriter; means for applying a first gating pulse to an input of said first "and" circuit corresponding to the termination of each of said percentage signals; and means for applying a second gating pulse to an input of said second "and" circuit subsequent to the first gating pulse corresponding to the last of said percentage signals.

3. The apparatus according to claim 2 wherein said analyzer is a chromatographic analyzer.

4. Analysis apparatus comprising:

(1) an analyzer adapted to provide a plurality of output voltages in sequence, each output voltage being representative of a component of the material being analyzed;

(2) timing apparatus comprising a coded means; means for reading said coded means; means for moving said coded means past said means for reading; a source of pulse signals; first counting means; means for applying the output of said source of pulse signals to an input of said first counting means; said first counting means having a plurality of output terminals with each of said output terminals corresponding to a different ratio of output pulses to input pulses; and means for controlling said means for moving to vary the speed of movement responsive to the output of one of said output terminals; and means for variably attenuating each of the output voltages of said analyzer responsive to the output of said means for reading;

(3) means for converting each of the thus attenuated output voltages of said analyzer into a fluctuating output signal, each said fluctuating output signal comprising a series of pulses having a frequency which is proportional to the amplitude of the respective attenuated output voltage of said analyzer;

(4) computing apparatus comprising second and third counting means; means for applying all of the output signals of said means for converting to said second counting means to register a value proportional to the number of pulses in the total output of said means for converting; means for applying in sequence individual output signals from said means for converting to said third counting means to register a value proportional to the number of pulses in the respective output signal from said means for converting; and means for producing a plurality of percentage signals, each being representative of a respective one of the outputs of said third counting means as a percentage of the output of said second counting means; and (5) recording means comprising, a fourth counting means; means for applying in sequence each of said percentage signals to an input of said fourth counting means; signal conversion means to produce an output which is suitable for controlling an automatic recording means; means for applying the output of said fourth counting means to an input of said signal conversion means; an automatic recording means; means for applying the output of said signal conversion means to an input of said automatic recording means.

5. Analysis apparatus comprising:

(1) an analyzer adapted to provide a plurality of output voltages in sequence, each output voltage being representative of a component of the material being analyzed;

(2) timing apparatus comprising a plurality of radiation sources; a plurality of radiation detectors; a coded means containing a plurality of code rows, each of said code rows containing at least one hole; said coded means being positioned between said radiation sources and said radiation detectors in such a manner that a code row in a reading position will be in alignment with said radiation sources and said radiation detectors; means for moving said coded means past said reading position; a source of pulse signals; first counting means; means for applying the output of said source of pulse signals to the input of said first counting means, said first counting means having a plurality of output terminals with each of said output teminals corresponding to a different ratio of output pulses to input pulses; means for controlling said means for moving to vary the speed of movement responsive to the output of one of said output terminals; and means for variably attenuating each of the output voltages of said analyzer responsive to the output of said plurality of radiation detectors;

(3) means for converting each of the thus attenuated output voltages of said analyzer into a fluctuating output signal, each said fluctuating output signal comprising a series of pulses having a frequency which is proportional to the amplitude of the respective attenuated output voltage of said analyzer;

(4) computing apparatus comprising second and third counting means; means for applying all of the output signals of said means for converting to said second counting means to produce a first output signal proportional to the number of pulses in the total output of said means for converting; means for applying in sequence individual output signals from said means for converting to said third counting means to produce a plurality of second output signals, each of said second output signals being proportional to the number of pulses in a respective one of said individual output signals; and means for dividing each of said second output signals from said third counting means by said first output signal from said second counting means to produce a plurality of percentage signals, each being proportional to a respective one of said second output signals from said third counting means as a percentage of said first output signal from said second counting means; and (5) recording apparatus comprising a component counter; means for applying each of said percentage signals in sequence to an input of said component counter; a total counter; means for applying a total signal representing the total of said plurality of percentage signals to an input of said total counter; clock means for producing a time signal; signal conversion means for producing an output which is suitable for controlling an automatic recording means; means for applying the outputs of said component counter to an input of said signal conversion means in sequence; means for applying the output of said total counter to an input of said signal conversion means subsequent to the termination of the last percentage signal of each analysis; means for applying the output of said clock means to an input of said signal conversion means at the beginning of each analysis cycle; an automatic recording means; and means for applying the output of said signal conversion means to an input of said automatic recording means.

6. Analysis apparatus comprising:

(1) an analyzer adapted to provide a plurality of output voltages in sequence, each output voltage being representative of a respective component of the material being analyzed;

(2) means for converting each of the output voltages of said analyzer into a fluctuating output signal, each said fluctuating output signal comprising a series of pulses having a frequency which is proportional to the amplitude of the respective output voltage of said analyzer;

(3) computing apparatus comprising first and second counting means; means for applying all of the output signals of said means for converting to said first counting means to register a value proportional to the number of pulses in the total output of said means for converting; means for applying in sequence individual output signals from said means for converting to said second counting means to register a value proportional to the number of pulses in the respective output signal from said means for converting; storage means for separately storing the individual output signals of said second counting means; means for transferring in sequence each of the individual output signals of said second counting means to said storage means; subtracting means; means for transferring the output of said first counting means to the minuend input of said subtracting means; means for transferring in sequence each of said individual output signals from said storage means to the subtrahend input of said subtracting means; and means for producing a plurality of percentage signals, each being representative of the number of times the respective individual output signal from said storage means can be subtracted from said output of said first counting means; and (4) recording means comprising, a component counter; means for applying each of said percentage signals to an input of said component counter in sequence; a total counter; means for applying the output of said first counting means to an input of said total counter; first and second "and" circuits; means for applying the outputs of said component counter to an input of said first "and" circuit; means for applying the output of said total counter to an input of said second "and" circuit; an "or" circuit; means for applying the outputs of said first and second "and" circuits to respective inputs of said "or" circuit; signal conversion means to produce an output which is suitable for controlling an automatic typewriter; means for applying the output of said "or" circuit to an input of said signal conversion means; an automatic typewriter; means for applying the output of said signal conversion means to an input of said automatic typewriter; means for applying a first gating pulse to an input of said first "and" circuit corresponds to the termination of each of said percentage signals; and means for applying a second gating pulse to an input of said second "and" circuit subsequent to the first gating pulse corresponding to the last of said percentage signals.

7. Analysis apparatus comprising:

(1) an analyzer adapted to provide a plurality of output voltages in sequence, each output voltage being representative of a respective component of the material being analyzed;

(2) means for converting each of the output voltages of said analyzer into a fluctuating output signal, each said fluctuating output signal comprising a series of pulses having a frequency which is proportional to the amplitude of the respective output voltage of said analyzer;

(3) computing apparatus comprising first and second counting means; means for applying all of the output signals of said means for converting to said first counting means to register a value proportional to the number of pulses in the total output of said means for converting; means for applying in sequence individual output signals from said means for converting to said second counting means to register a value proportional to the number of pulses in the respective output signal from said means for converting; and means for producing a plurality of percentage signals, each being representative of a respective one of the outputs of said second counting means as a percentage of the output of said first counting means; and (4) recording means comprising, a third counting means; means for applying in sequence each of said percentage signals to an input of said third counting means; signal conversion means to produce an output which is suitable for controlling an automatic recording means; means for applying the output of said third counting means to an input of said signal conversion means; an automatic recording means; means for applying the output of said signal conversion means to an input of said automatic recording means.

8. Analysis apparatus comprising:

(1) an analyzer adapted to provide a plurality of output voltages in sequence, each output voltage being representative of a respective component of the material being analyzed;

(2) means for converting each of the output voltages of said analyzer into a fluctuating output signal, each said fluctuating output signal comprising a series of pulses having a frequency which is proportional to the amplitude of the respective output voltage of said analyzer;

(3) computing apparatus comprising first and second counting means; means for applying all of the output signals of said means for converting to said first counting means to produce a first output signal proportional to the number of pulses in the total output of said means for converting; means for applying in sequence individual output signals from said means for converting to said second counting means to produce a plurality of second output signals, each of said second output signals being proportional to the number of pulses in a respective one of said individual output signals; and means for dividing each of said second output signals from said second counting means by said first output signal from said first counting means to produce a plurality of percentage signals, each being proportional to a respective one of said second output signals from said second counting means as a percentage of said first output signal from said first counting means; and (4) recording apparatus comprising a component counter; means for applying each of said percentage signals in sequence to an input of said component counter; a total counter; means for applying a total signal representing the total of said plurality of percentage signals to an input of said total counter; clock means for producing a time signal; signal conversion means for producing an output which is suitable for controlling an automatic recording means; means for applying the outputs of said component counter to an input of said signal conversion means in sequence; means for applying the output of said total counter to an input of said signal conversion means subsequent to the termination of the last percentage signal of each analysis; means for applying the output of said clock means to an input of said signal conversion means at the beginning of each analysis cycle; an automatic recording means; and means for applying the output of said signal conversion means to an input of said automatic recording means.

References Cited by the Examiner

UNITED STATES PATENTS

| | | | |
|---|---|---|---|
| 2,736,881 | 2/1956 | Booth | 235—164 X |
| 2,905,821 | 9/1959 | Younkin | 250—41.9 |
| 2,912,164 | 11/1959 | Seevers | 235—193 |
| 2,966,673 | 12/1960 | Guernsey | 340—162.5 X |
| 3,000,003 | 9/1961 | Einsel | 235—151 |
| 3,005,911 | 10/1961 | Burhans | 235—151 |
| 3,006,547 | 10/1961 | Fellows et al. | 235—196 X |
| 3,023,961 | 3/1962 | Stafford | 235—164 |
| 3,027,086 | 3/1962 | Hargens et al. | 235—193 |
| 3,034,718 | 5/1962 | Freitas et al. | 235—151 |
| 3,064,896 | 11/1962 | Carroll et al. | 235—164 |
| 3,079,079 | 2/1963 | Phister et al. | 235—151 |
| 3,100,097 | 8/1963 | Woltersdorf | 235—196 X |
| 3,147,370 | 9/1964 | Lowman | 235—151 |
| 3,150,253 | 9/1964 | Spergel | 235—193 X |

MALCOLM A. MORRISON, *Primary Examiner.*

C. L. WHITHAM, I. KESCHNER, *Assistant Examiners.*